(12) United States Patent
Mansir et al.

(10) Patent No.: US 12,523,131 B2
(45) Date of Patent: Jan. 13, 2026

(54) ELECTRIC SUBMERSIBLE PUMP WITH ACTIVE COOLING

(71) Applicant: Halliburton Energy Services, Inc., Houston, TX (US)

(72) Inventors: Hassan Mansir, Frimley (GB); Andras Bencze, Frimley (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/753,507

(22) Filed: Jun. 25, 2024

(65) Prior Publication Data

US 2025/0389174 A1    Dec. 25, 2025

(51) Int. Cl.
*E21B 43/12* (2006.01)
*E21B 23/04* (2006.01)
*E21B 36/00* (2006.01)
*H02K 9/19* (2006.01)

(52) U.S. Cl.
CPC ............. *E21B 43/128* (2013.01); *H02K 9/19* (2013.01); *E21B 23/0419* (2020.05); *E21B 36/001* (2013.01); *E21B 43/126* (2013.01)

(58) Field of Classification Search
CPC combination set(s) only.
See application file for complete search history.

(56) References Cited

U.S. PATENT DOCUMENTS

| | | |
|---|---|---|
| 1,960,484 A | 5/1934 | Ekstromer |
| 1,978,986 A | 10/1934 | Coberly |
| 2,098,958 A | 11/1937 | Ekstromer |
| 3,407,320 A | 10/1968 | Mclean |
| 3,952,218 A | 4/1976 | Deters |
| 4,053,196 A | 10/1977 | Dunaway |
| 4,409,504 A | 10/1983 | Wilson |

(Continued)

FOREIGN PATENT DOCUMENTS

| | | |
|---|---|---|
| CA | 2530162 C | 6/2009 |
| CA | 2590566 C | 7/2014 |

(Continued)

OTHER PUBLICATIONS

Foreign Communication from Related Application-International Search Report and Written Opinion of the International Searching Authority, International Application No. PCT/US2024/047400, dated May 15, 2025, 9 pages.

(Continued)

*Primary Examiner* — Binh Q Tran
(74) *Attorney, Agent, or Firm* — Conley Rose, P.C.; Rodney B. Carroll

(57) ABSTRACT

An electric submersible pump includes a heat exchanger, a shaft comprising an axial bore, and a motor, which includes a rotor rotationally coupled to the shaft, a stator concentrically disposed with respect to the rotor, and a journal bearing disposed between the stator and the shaft. There is a gap between the rotor and the stator. The electric submersible pump further includes a first pump mechanically coupled to the shaft and configured to pump production fluid through a tubular, and a second pump mechanically coupled to the shaft and configured to pump coolant through the axial bore, the gap, and the heat exchanger. The heat exchanger transfers heat from the coolant to the production fluid to cool the motor.

24 Claims, 12 Drawing Sheets

(56) References Cited

U.S. PATENT DOCUMENTS

| | | | |
|---|---|---|---|
| 4,549,105 A | 10/1985 | Yamamoto | |
| 5,068,554 A | 11/1991 | Mohn | |
| 5,821,660 A | 10/1998 | Anderson | |
| 5,982,074 A | 11/1999 | Smith | |
| 6,388,353 B1 | 5/2002 | Liu | |
| 6,700,252 B2 | 3/2004 | Fleshman | |
| 6,794,788 B1 | 9/2004 | Smith | |
| 6,811,382 B2 | 11/2004 | Buchanan | |
| 6,837,621 B1 | 1/2005 | Sakamoto | |
| 8,076,809 B2 | 12/2011 | Tingler | |
| 8,330,308 B2 | 12/2012 | Denny | |
| 8,353,336 B2 | 1/2013 | Neuhaus | |
| 8,358,043 B2 | 1/2013 | Tetzlaff | |
| 8,408,312 B2 | 4/2013 | Fielder | |
| 8,443,900 B2 | 5/2013 | Fielder | |
| 8,476,854 B2 | 7/2013 | Blocher | |
| 8,590,609 B2 | 11/2013 | Smithson | |
| 8,692,408 B2 | 4/2014 | Zhang | |
| 8,696,327 B2 | 4/2014 | Forsberg | |
| 8,866,425 B2 | 10/2014 | Lund | |
| 8,899,054 B2 | 12/2014 | Jankowski | |
| 9,057,256 B2 | 6/2015 | Ige | |
| 9,394,917 B2 | 7/2016 | Jankowski | |
| 9,601,925 B2 | 3/2017 | Stinessen | |
| 9,638,020 B2 | 5/2017 | Hay | |
| 9,797,402 B2 | 10/2017 | Jankowski | |
| 9,899,838 B2 | 2/2018 | Elasser | |
| 10,100,835 B2 | 10/2018 | Torrey | |
| 10,110,013 B2 | 10/2018 | Dong | |
| 10,122,167 B2 | 11/2018 | Boe | |
| 10,135,310 B2 | 11/2018 | Schuler | |
| 10,141,803 B2 | 11/2018 | Schuler | |
| 10,177,620 B2 | 1/2019 | Smith | |
| 10,385,856 B1* | 8/2019 | Shakirov | F04D 13/086 |
| 10,605,057 B2 | 3/2020 | Huynh | |
| 10,844,875 B2 | 11/2020 | Zia | |
| 11,118,587 B1 | 9/2021 | Shakirov et al. | |
| 2002/0066568 A1 | 6/2002 | Buchanan | |
| 2002/0079763 A1 | 6/2002 | Fleshman | |
| 2004/0136849 A1 | 7/2004 | Du | |
| 2006/0081377 A1* | 4/2006 | Bullock | E21B 43/128 166/385 |
| 2007/0096571 A1 | 5/2007 | Yuratich | |
| 2007/0273225 A1 | 11/2007 | Head | |
| 2009/0127956 A1 | 5/2009 | Ozaki | |
| 2009/0269224 A1 | 10/2009 | Hunt et al. | |
| 2010/0244595 A1 | 9/2010 | Sheth | |
| 2010/0329908 A1 | 12/2010 | Martinez et al. | |
| 2011/0211979 A1 | 9/2011 | Schlenhoff et al. | |
| 2011/0309726 A1 | 12/2011 | Carpenter | |
| 2013/0038144 A1 | 2/2013 | McAleese | |
| 2013/0192824 A1 | 8/2013 | Fielder | |
| 2013/0272898 A1 | 10/2013 | Toh | |
| 2014/0042842 A1 | 2/2014 | Tokoi | |
| 2015/0034294 A1 | 2/2015 | Miles | |
| 2015/0064032 A1 | 3/2015 | Sadana | |
| 2015/0129221 A1* | 5/2015 | Mazyar | E21B 43/128 166/302 |
| 2015/0139822 A1 | 5/2015 | Jankowski | |
| 2016/0099663 A1 | 4/2016 | Petrowsky | |
| 2016/0130923 A1 | 5/2016 | Nowitzki | |
| 2016/0222770 A1 | 8/2016 | Kirk | |
| 2016/0251956 A1 | 9/2016 | Parra | |
| 2016/0380560 A1 | 12/2016 | Torrey | |
| 2017/0264170 A1 | 9/2017 | Oyarzun | |
| 2017/0292533 A1* | 10/2017 | Zia | E21B 43/121 |
| 2018/0128268 A1 | 5/2018 | Bornemann | |
| 2018/0142541 A1 | 5/2018 | Yuratich | |
| 2018/0145574 A1 | 5/2018 | McCaw | |
| 2019/0032459 A1* | 1/2019 | Pires | H02K 9/19 |
| 2019/0120249 A1 | 4/2019 | Judge | |
| 2019/0123609 A1 | 4/2019 | Wilcox | |
| 2019/0145428 A1 | 5/2019 | Judge | |
| 2019/0162457 A1 | 5/2019 | de Larminat | |
| 2019/0253000 A1 | 8/2019 | Kratchman | |
| 2019/0296659 A1 | 9/2019 | Reitz | |
| 2020/0072245 A1* | 3/2020 | Chen | F04D 13/10 |
| 2020/0220431 A1 | 7/2020 | Wrighton | |
| 2022/0243569 A1* | 8/2022 | Crane | F04D 29/0473 |
| 2023/0383631 A1* | 11/2023 | Garrett | F04D 29/043 |

FOREIGN PATENT DOCUMENTS

| | | |
|---|---|---|
| CN | 201409032 Y | 2/2010 |
| CN | 201813291 U | 4/2011 |
| CN | 203942424 U | 11/2014 |
| CN | 205283276 U | 6/2016 |
| CN | 110154786 A | 8/2019 |
| DE | 3103508 A1 | 10/1982 |
| DE | 102005003476 A1 | 7/2006 |
| DE | 102008035609 A1 | 2/2010 |
| EP | 0858145 A2 | 8/1998 |
| GB | 1060570 A | 3/1967 |
| JP | 2003120571 A | 4/2003 |
| JP | 2017093013 A | 5/2017 |
| JP | 2020127301 A | 8/2020 |
| JP | 2022034309 A | 3/2022 |
| WO | 0139353 A1 | 5/2001 |
| WO | 2015178887 A1 | 11/2015 |
| WO | 2016049244 A1 | 3/2016 |
| WO | 2016174448 A1 | 11/2016 |
| WO | 2017077813 | 5/2017 |
| WO | 2019022880 A1 | 1/2019 |
| WO | 2020069304 A1 | 4/2020 |
| WO | 20210414 | 10/2020 |

OTHER PUBLICATIONS

Foreign Communication from Related Application—International Search Report and Written Opinion of the International Searching Authority, International Application No. PCT/US2024/039700, dated Mar. 19, 2025, 11 pages.

Foreign Communication from Related Application-International Search Report and Written Opinion of the International Searching Authority, International Application No. PCT/US2021/021931, dated Jul. 9, 2021, 12 pages.

Foreign Communication from Related Application-International Search Report and Written Opinion of the International Searching Authority, International Application No. PCT/US2021/021932, dated Jul. 9, 2021, 13 pages.

Foreign Communication from Related Application-International Search Report and Written Opinion of the International Searching Authority, International Application No. PCT/US2021/021933, dated Jul. 1, 2021, 10 pages.

Foreign Communication from Related Application-International Search Report and Written Opinion of the International Searching Authority, International Application No. PCT/US202 /021934, dated Jul. 1, 2021, 9 pages.

Filing Receipt, Specification and Drawings for U.S. Appl. No. 63/007,052, entitled "Axial Flux Submersible Electric Motor," filed Apr. 8, 2020, 65 pages.

Zhang, Zhuoran et al., "Feasibility of a New Iron-less-stator Axial Flux Permanent Magnet Machine for Aircraft Electric Propulsion Application," CES Transactions on Electrical Machines and Systems, Mar. 2019, pp. 30-38, vol. 3, No. 1, IEEE.

Syed, Qurban Ali Shah et al., "Magnetization Characteristics and Loss Measurements of the Axial Flux Permanent Magnet Motors Stator," 2019 IEEE International Electric Machines Drives Conference, May 2019, pp. 1061-1066, IEEE.

Filing Receipt, Specification and Drawings for U.S. Appl. No. 17/196,223, entitled "Axial Flux Submersible Electric Motor," filed Mar. 9, 2021, 71 pages.

Filing Receipt, Specification and Drawings for U.S. Appl. No. 17/196,230, entitled "Axial Flux Submersible Electric Motor," filed Mar. 9, 2021, 70 pages.

Filing Receipt, Specification and Drawings for U.S. Appl. No. 17/196,234, entitled "Axial Flux Submersible Electric Motor," filed Mar. 9, 2021, 70 pages.

(56) References Cited

OTHER PUBLICATIONS

Filing Receipt, Specification and Drawings for U.S. Appl. No. 17/196,239, entitled "Axial Flux Submersible Electric Motor," filed Mar. 9, 2021, 77 pages.

Nasiri-Gheidari, Zahra et al., "A Survey on Axial Flux Induction Motors," Electrical Review, Feb. 2012, ISSN 0033-2097, pp. 300-305, University of Tehran.

Aydin, M. et al., "Axial Flux Permanent Magnet Disc Machines: A Review," Wisconsin Electric Machines Power Electronics Con•sortium, Oct. 2004, 12 pages, University of Wisconsin-Madison.

Moreels, Daan et al., "High Efficiency Axial Flux Machines: Why Axial Flux Motor and Generator Technology Will Drive the Next Generation of Electric Machines," Apr. 2018, White Paper VI.5, 26 pages, Magnax.

Sheth, Ketan et al., "Viscosity Correction Factors," 2009 Society of Petroleum Engineers Gulf Coast Section Electric Submersible Pump Workshop, Apr. 29-May 1, 2009, 11 pages, SPE-Gulf Coast.

Orrego, Yarnila et al., "Enhanced ESP Motor Cooling-Design, Testing and Field Trial," 2011 Society of Petroleum Engineers• Gulf Coast Section Electric Submersible Pump Workshop, Apr. 25-29, 2011, 9 pages, SPE-Gulf Coast.

OBryan, Roshani et al., "Validation of Heat Transfer Performance of Electrical Submersible Motor Using CFD," ASME 2010 3rd Joint US-European Fluids Engineering Summer Meeting and 8th Inte•• national Conference on Nanochannels, Microchannels, and Minichannels, Aug. 2-4, 2010, 9 pages, American Society of Mechanical Engineers.

Jankowski, Todd A. et al., "Development and Validation of a Thermal Model for Electric Induction Motors," IEEE Transactions on Industrial Electronics, Dec. 2010, vol. 57, No. 12, pp. 4043-4054, IEEE.

Office Action dated Feb. 9, 2023 (23 pages), U.S. Appl. No. 17/530,714, filed Nov. 19, 2021.

Foreign Communication from Related Application-International Search Report and Written Opinion of the International Searching Authority, International Application No. PCT/US2022/045539, dated Feb. 1, 2023, 11 pages.

Office Action dated Jan. 20, 2023 (38 pages), U.S. Appl. No. 17/196,234, filed Mar. 9, 2021.

Office Action dated Apr. 11, 2023 (31 pages), U.S. Appl. No. 17/196,223, filed Mar. 9, 2021.

First Office Action dated Jun. 30, 2023 (52 pages), U.S. Appl. No. 17/196,230, filed Mar. 9, 2021.

Final Office Action dated Jul. 7, 2023 (33 pages), U.S. Appl. No. 17/196,234, filed Mar. 9, 2021.

Kahourzade, Solrnaz et al., "A Comprehensive Review of Axia••Flux Permanent-Magnet Machines," Canadian Journal of Electrical and Computer Engineering, 2014, pp. 19-33, vol. 37, No. 1, IEEE.

Foreign Communication from Related Application-European Search Report, European Application No. 21785508.9, dated Aug. 16, 2023, 13 pages.

Foreign Communication from Related Application-European Search Report, European Application No. 21784953.8, dated Aug. 10, 2023, 17 pages.

Foreign Communication from Related Application-European Search Report, European Application No. 21784039.6, dated Aug. 28, 2023, 16 pages.

Foreign Communication from Related Application-European Search Report, European Application No. 21785444.7, dated Aug. 14, 2023, 13 pages.

Foreign Communication from Related Application-European Search Report, European Application No. 21784954.6, dated Aug. 8, 2023, 9 pages.

Office Action dated Aug. 8, 2023 (33 pages), U.S. Appl. No. 17/196,223, filed Mar. 9, 2021.

Office Action dated Nov. 21, 2023 (29 pages), U.S. Appl. No. 17/196,230, filed Mar. 9, 2021.

Office Action dated Feb. 8, 2023 (23 pages), U.S. Appl. No. 17/530,714, filed Nov. 19, 2021.

Filing Receipt, Specification and Drawings for U.S. Appl. No. 18/640,350, entitled "Axial Flux Submersible Electric Motor," filed Apr. 19, 2024, 88 pages.

Filing Receipt, Specification and Drawings for U.S. Appl. No. 18/809,988, entitled "Enhanced Cooling of Non-Encapsulated Motor Stators for Electrical Submersible Pumps," filed Aug. 20, 2024, 49 pages.

\* cited by examiner

ELECTRIC SUBMERSIBLE PUMP WITH ACTIVE COOLING

CROSS-REFERENCE TO RELATED APPLICATIONS

None.

STATEMENT REGARDING FEDERALLY SPONSORED RESEARCH OR DEVELOPMENT

Not applicable.

BACKGROUND

Electric submersible pumps (EPS) may be deployed in a well bore to pump fluid from underground reservoirs to the surface. The electric motor(s) of the ESP may be energized from surface to produce the required torque to drive the pump(s) of the ESP and produce fluid to surface. The work done by the electric motor(s) may generate heat inside the motor. Produced fluid passing over the motor may help cool the motor. The fluid properties, the production flowrate and the annular flow area may directly impact the cooling effectiveness. In applications with insufficient flow, large annular flow area, or high gas-to-oil ratio, the cooling effectiveness may be reduced, and thus the electric motor may overheat and eventually fail. In applications with permanent magnet motors (PMM) s operating at high speed, the velocity of the flow passing over the motor is unlikely to be adequate, especially if the diameter of the well is relatively small. This type of electric motor may suffer from higher losses, and thus can generate significantly more heat per surface area. In many applications, scale can build up on the motor housing over time. When this happens, the motor housing heat transfer coefficient may be affected, significantly diminishing the cooling effectiveness of the flow passing over the motor. A shroud can be provided around the ESP and a packer or packers can be installed to force the produced fluid to flow over the surface of the motor. However, this can be expensive and complicated. In some installations, the pump intake may be positioned below the perforations to maximize the wellbore drawdown. This method of ESP deployment can also reduce the gas content present in the fluid at the pump intake due to the gas natural separation from the mixture, decreasing the risk of gas locking and increasing the efficiency of the pump(s). In such cases, the motor is in a part of the wellbore where the fluid is stagnant. Thus, the cooling effectiveness may be greatly affected, as the heat transfer between the electric motor and the static fluid may be reduced. The system and method of the present disclosure may address one or more of these issues.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
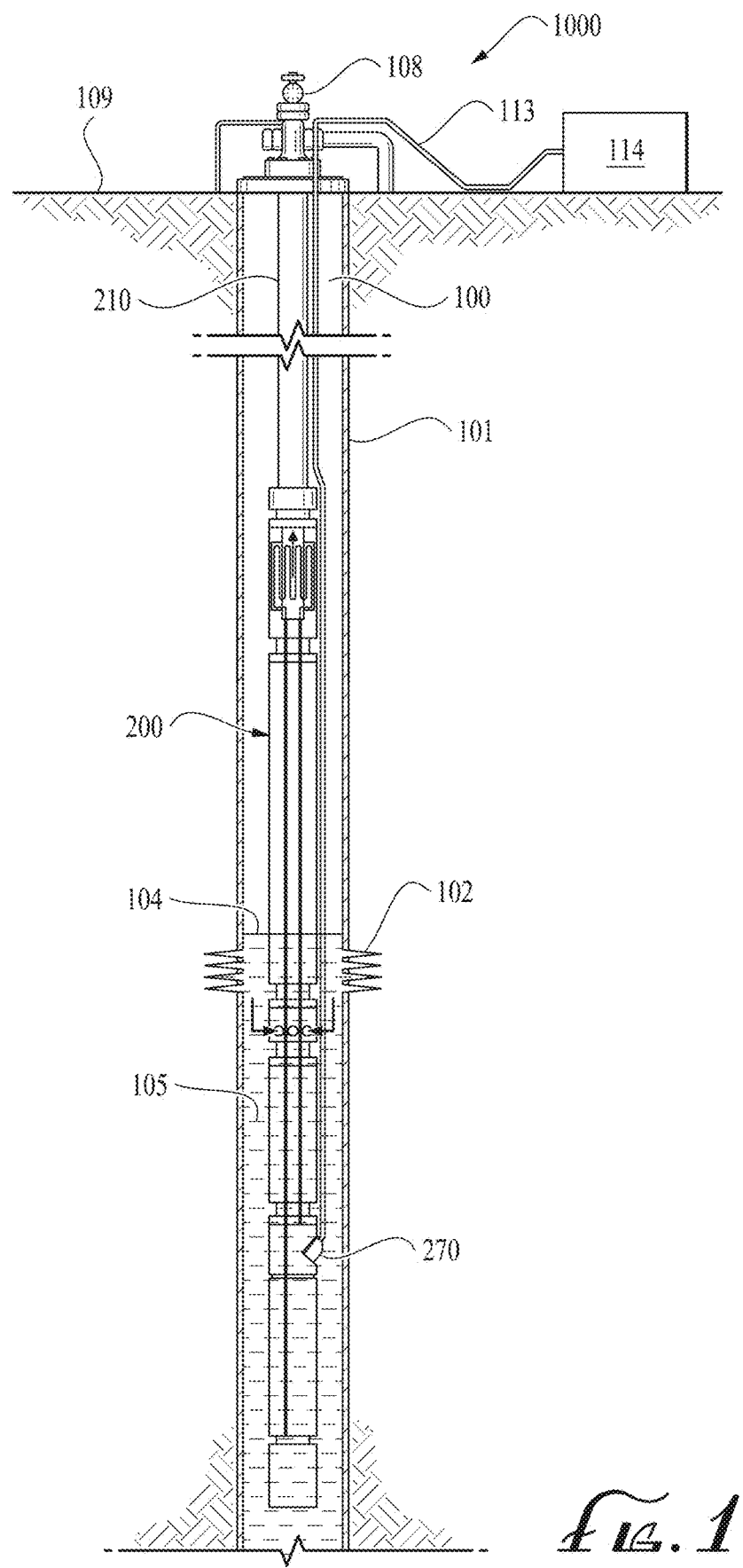
FIG. 1 is a schematic diagram of an exemplary well environment according to an embodiment of the present disclosure.

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

As used herein the terms "uphole", "upwell", "above", "top", and the like refer directionally in a wellbore towards the surface, while the terms "downhole", "downwell", "below", "bottom", and the like refer directionally in a wellbore towards the toe of the wellbore (e.g. the end of the wellbore distally away from the surface), as persons of skill will understand. Orientation terms "upstream" and "downstream" are defined relative to the direction of flow of fluid, for example relative to flow of well fluid in the well. As used herein, orientation terms "upstream," "downstream," are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid.

Systems and methods are disclosed herein for forcibly cooling a motor of an ESP, which may act in addition to the cooling effect of the well bore fluid passing over the motor. The system may include an external heat exchanger located outside of the downhole electric motor and a rotary positive displacement pump joined with the electric motor rotating shaft. The rotary positive displacement pump may move the motor fluid from the lower end (e.g., base) of the motor through a central bore in the rotor shaft, through radial bearing feed holes, and through an air gap to the top side (e.g., motor head) of the motor. Additionally, or alternatively, the motor fluid may be forced to return from the motor head to the motor base through the voids in the winding slots in the stator and/or custom slots/holes in the stator lamination stack. The forced motor fluid flow within the electric motor may improve the heat removal from the stator and the rotor. The heated oil may be then circulated through an external heat exchanger, which can be positioned in several locations on the ESP string that are exposed to a produced fluid flow.

A rotary positive displacement pump (e.g., gear, vane, lobe or other type) may be implemented to forcibly circulate the motor fluid within the motor and an external heat exchanger. Rotary positive displacement pumps may have the advantage of being highly reliable, especially if the pumped medium is a lubricating fluid (e.g. a dielectric oil, with adequate viscosity and lubricating characteristics). The temperature limitation of the pump may be driven by the pumped media and the motor temperature rating, since the pump may be fully submerged in the pumped medium and may not require a rotary seal on the drive shaft. Rotary positive displacement pumps can be custom designed to work over a defined speed range and to produce the required flowrate for various operating speeds of the ESP. In some embodiments, the pump may generate more flow than the centrifugal force acting on the motor fluid in the bore of the shaft. This may ensure that all bearings, including the thrust bearing, are sufficiently supplied with cooled oil, thus improving the cooling of the bearings too. This in turn may extend the reliability and the life of the journal bearings. An external heat exchanger may be utilized to enhance the motor cooling.

The heated oil may be forced to leave the motor through auxiliary tubing, and it may be pushed through the heat transfer elements of the heat exchanger. The heat exchanger may be preferably positioned in an area of the ESP exposed to the full production fluid flow. This may provide an additional more effective heat transfer between the heated oil and the well bore fluid. Having an additional cooling system and recirculating pump in an ESP may extend the run life of the downhole motor. For high-speed downhole motors (e.g., speed range between 4000 and 10000 rpm), may provide additional cooling and may forcibly supply the bearing with cooler motor fluid via the rotary positive displacement pump.

Referring to FIG. 1 an exemplary well site environment 1000 is shown. The well site environment 1000 may include a wellbore 100 that is at least partially cased with casing 101. The wellbore 100 may be substantially vertical, but the electric submersible pump (ESP) assembly 106 described herein also may be used in a wellbore 100 that has a deviated or horizontal portion. The well site environment 1000 may be at an on-shore location or at an off-shore location.

An electric cable 113 may attach to the motor lead extension 270 and extend to the surface 109 to connect to a controller 114. The controller may supply power to the motor 300. In some embodiments, the controller 114 is a variable frequency drive (VFD) which may control the speed of the motor. The electric cable 113 may be banded or strapped to the production tubing 210.

A wellhead 108 may be disposed at the surface 109 and may be connected to the production tubing 210 and the cable 113. The wellbore fluid 105 may flow uphole in the wellbore 100 and into the ESP 200. The wellbore fluid 105 may comprise a liquid phase fluid, or the wellbore fluid 105 may comprise a gas phase fluid mixed with a liquid phase fluid. Under normal operating conditions (e.g., wellbore fluid 105 flows out of the perforations 102), the ESP 200 may be energized by electric power, and the electric motor of the ESP 200 may turn. The ESP 200 may provide pumping pressure or pump head to lift the wellbore fluid 105 to the surface 109. The well fluid 105 may comprise hydrocarbons such as crude oil and/or natural gas. The well fluid 105 may comprise water. In a geothermal application, the well fluid 105 may comprise hot water.

In some embodiments, the ESP 200 may be implemented into a horizontal pumping system. For example, the ESP 200 may be mounted on a skid for easy transportation to a location on a truck. The skid may be placed on the ground at the location. For example, the ESP 200 may be used for creating pressure in a crude oil pipeline and/or as a flow booster. The ESP 200 can be used in a mine dewatering operation (e.g., removing water from a mine). The ESP 200 can be used in geothermal energy applications, for example, to pump geothermal water from a wellhead through a pipe to an end-use or energy conversion facility. The ESP 200 can be used in carbon sequestration operations. The ESP 200 can be used in salt water disposal operations, for example, receiving salt water from a wellbore and pumping the salt water under pressure down into a disposal well. The ESP 200 can be used in desalinization operations.

Figure 2:
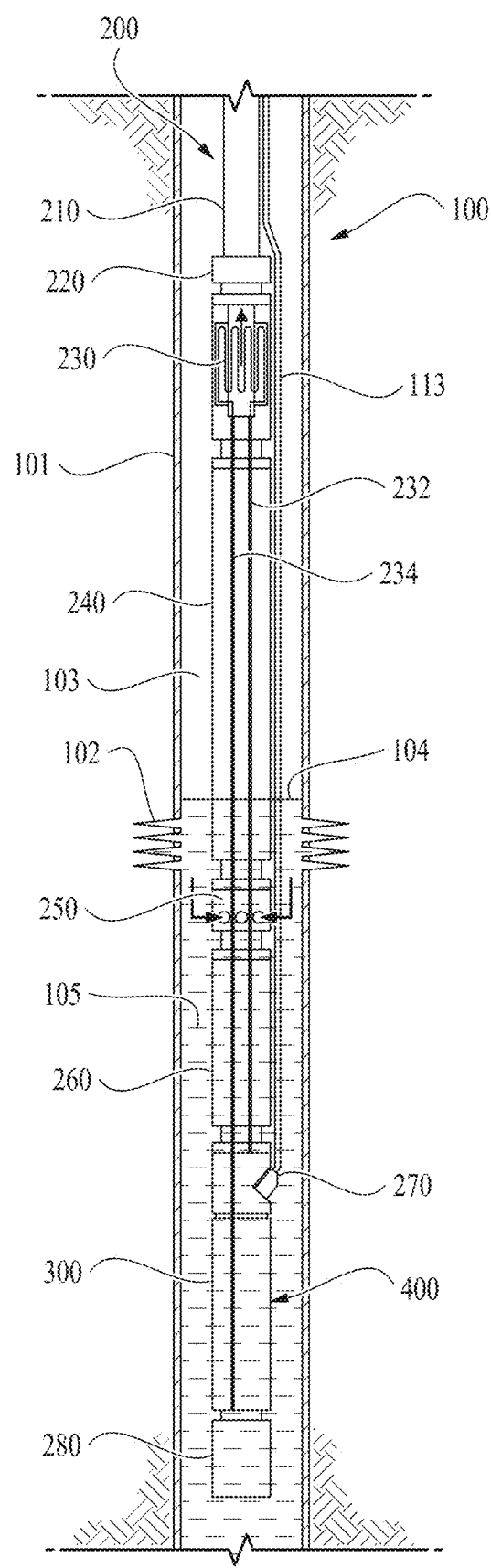
FIG. 2 is a schematic diagram of an exemplary ESP according to an embodiment.

Referring to FIG. 2, an exemplary ESP 200 is shown in a wellbore 100. The wellbore 100 may be lined with a casing 101 which may have perforations 102. The ESP 200 may include a production tubing 210, pump discharge head 220, a centrifugal pump 240 (e.g., multiple centrifugal pumps), a pump intake 250, a seal section 260 (e.g., multiple seal sections), a motor lead extension (MLE) 270, an electric motor (e.g., induction or permanent magnet motor) 300, and downhole gauge 280. The heat exchanger 230 may be located at or near the pump discharge head 220 or it can be integrated in it. The heat exchanger 230 may be located between the pump discharge head 220 and the production tubing 210. This arrangement of the heat exchanger 230 in the ESP may be advantageous in that the additional external heat transfer elements of the heat exchanger 230 are positioned at a location in the ESP string where the wellbore fluid 105 is always present and flows at the full production rate, regardless of the setting depth of the ESP 200.

The heat exchanger 230 may be connected to the motor 300 via control lines (e.g., steel tubing) 232 and 234. In some embodiments, the tubing 232 connects to the motor head and the tubing 234 connects to the motor base. The heated motor fluid may exit the motor through tubing 232 and the cooled motor fluid may return to the motor base through tubing 234. The motor 300 may be positioned below the wellbore perforations 102, and for example, the pump intake 250 may be close to the perforations 102. The external heat exchanger 230 configuration shown in FIG. 2 can be used, for example, in application in which the motor is set below the perforations. The wellbore fluid level 104 in the well bore 100 may be close to the pump intake 250 and the perforations 102, such that during drawdown of the well 100, the wellbore fluid 105 may flow from the perforations 102 directly to the pump intake 250. As a result, the wellbore fluid 105 around the motor 300 can stagnate, thus reducing the cooling effect of the wellbore fluid 105 passing the motor 300 may be reduced. To counteract this, the heat exchanger 230 may be located near the pump discharge head 220 and the production tubing 210 which may improve cooling of the motor 300. The produced wellbore fluid 105 may be always forced through the internal passageways of the heat exchanger 230 by the centrifugal pump 240 while in operation, thus continuously cooling the heated oil forced through the cooling tubes of the heat exchanger 230. The pump 240 is a positive displacement pump.

Figure 3:
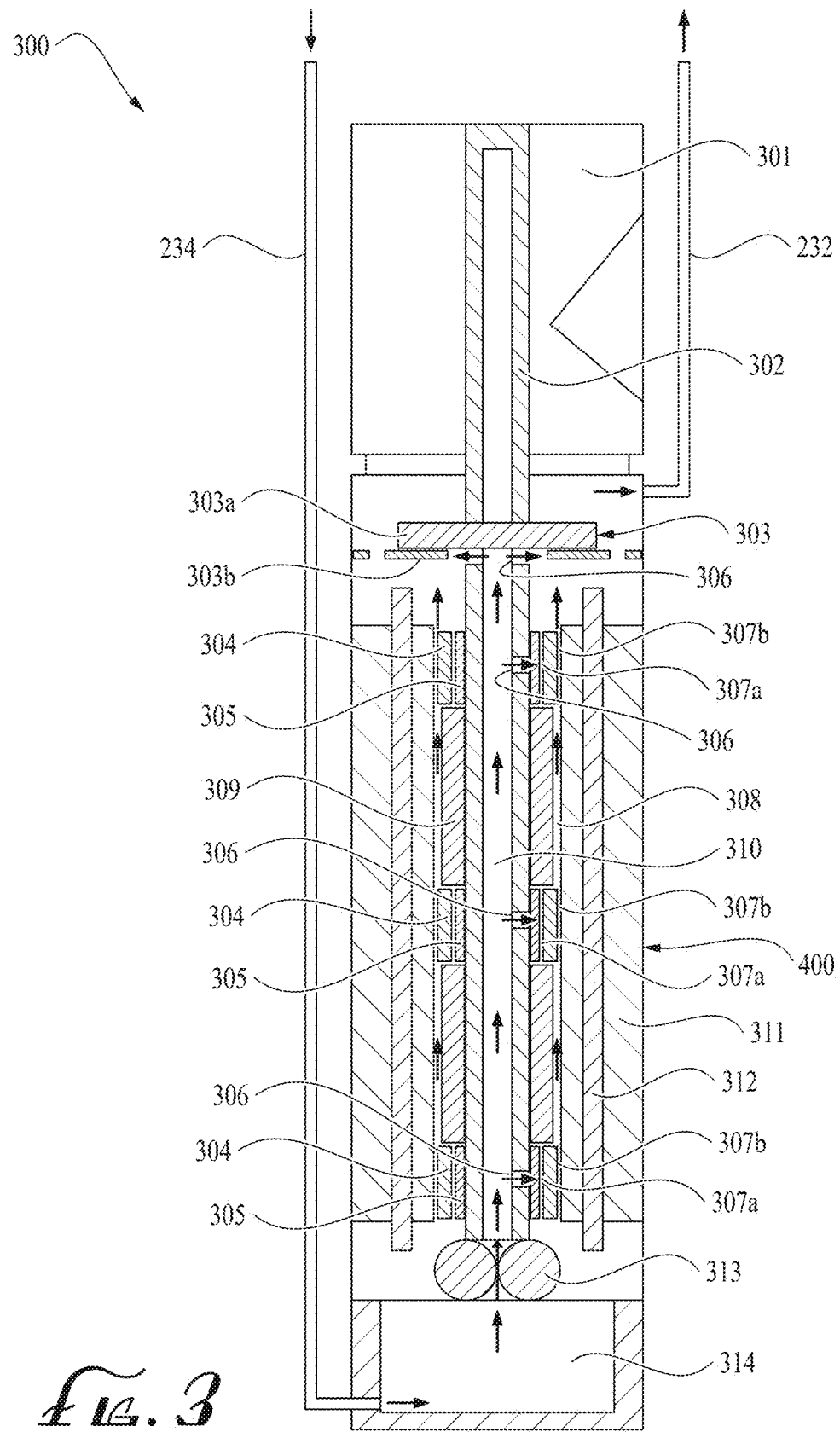
FIG. 3 is a cross-sectional schematic diagram of an exemplary motor according to an embodiment.

Referring to FIG. 3, an exemplary motor 300 is shown. The motor 300 may include a rotary positive displacement pump 313, which forcibly moves fluid from the motor base through the shaft bore 310, bearing radial holes 306, and air gap 308 to the motor head. As used herein, the "air gap" is merely a term to describe the radial or annular gap between the rotor module 309 and the stator 311 and need not be literally filled with air. The air gap 308 may be an annular gap. In some embodiments, the driving gear is the rotary positive displacement pump 313 which may be mechanically connected to the non-drive end (e.g., at the motor base) of the rotor shaft 302, either directly or via a reduction gear. For higher motor speeds, it may be necessary to operate the rotary pump 313 at a lower speed than the rotor shaft 302, and thus a reduction gear may be used.

The rotary pump 313 may push the motor fluid through the motor in addition to the flow generated by the centrifugal force of the rotating shaft 302. The rotary displacement pump 313 may draw cool motor fluid from the sump 314 at the motor base and force the motor fluid through the bore 310 of the shaft 302, through the radial holes 306 supplying the journal bearings 304, 305 and the thrust bearing 303, and the air gap 308 and bearing gaps 307a,307b from the motor base to the motor head. The main heat source in the motor may be the winding 312, which may be embedded in the stator 311. The heat dissipation in the stator stack through conduction may be supplemented with the forced cooling of the stator stack bore as the motor fluid (e.g., a coolant such as an oil) travelling from the motor base to the motor head heats up by cooling the bore of the stator 311, the shaft 302, the bearing 305, the rotor modules 309, and the thrust bearing assembly 303. The heated oil may then exit the motor through the tubing 232 connected to the heat exchanger 230. The cooler motor fluid from the heat exchanger 230 may return to the sump 314 in the motor base through the tubing 234. The thrust bearing 303 may include a thrust runner 303a and thrust pads 303b. The thrust pads 303b may be part of the stator and support weight through the thrust runner 303a. For example, the thrust pads 303b may be connected to the stator housing.

Referring to FIGS. 2-3, the ESP 200 comprises a heat exchanger 230, a shaft 302 comprising an axial bore 310, and a motor 300. The motor 300 may include a rotor 309 rotationally coupled to the shaft 302 and a stator 311 concentrically disposed with respect to the rotor 309. An annular gap 308 may be formed between the rotor 309 and the stator 311. A journal bearing 304 may be disposed between the stator 311 and the shaft 302. The journal bearing 304 may have a bearing gap (e.g., clearance) 307a. Another gap 307b may be formed from clearance between the journal bearing 304 and the stator 311. The radial journal bearings 304 may each have two components, which may be a journal mounted on the shaft 302 and a static sleeve attached to the stator 311. The gap 307a may be between the journal and the static sleeve. Typically, there may be axial holes in the sleeve for allowing the oil to move through the sleeve.

A first pump 240 may be mechanically coupled to the shaft 302 and configured to pump production fluid through a tubular 210. A second pump 313 may be mechanically coupled to the shaft 302 and configured to pump coolant through the axial bore 310, the annular gap 308, and the heat exchanger 230. The heat exchanger 230 may be configured to transfer heat from the coolant to the production fluid.

The ESP 200 may further include a pump discharge head 220 configured to output the production fluid into the production tubing 210, a pump intake 250 configured to intake the production fluid, a seal section 260 configured to seal the motor 300 from the production fluid, a downhole gauge 280 configured to measure a parameter within a wellbore, a housing 400 enclosing at least the motor, a first tubing 232 disposed at least partially outside of the housing and configured to transfer the coolant from the motor to the heat exchanger, and/or a second tubing 234 disposed at least partially outside of the housing 400 and configured to transfer the coolant from the heat exchanger to the motor. The heat exchanger 230 may be disposed between the pump discharge head 220 and the first pump 240. The first pump 240 may be disposed between the heat exchanger 230 and the pump intake 250. The pump intake 250 may be disposed between the first pump 240 and the seal section 260. The seal section 260 may be disposed between the pump intake 250 and the motor 300. The motor 300 may be disposed between the seal section 260 and the gauge 280.

A housing 400 may enclose at least the motor 300. The housing 400 may enclose some or all of the components of the ESP 200. A first tubing 232 may extend from the motor 300 uphole of the stator 311. The first tubing 232 may be disposed at least partially outside of the housing 400. The first tubing 232 may transfer the coolant from the motor 300 to the heat exchanger 230. The second tubing 234 may extend from the motor 300 downhole of the stator 311. The second tubing 234 may be disposed at least partially outside of the housing 400. The second tubing 234 may transfer the coolant from the heat exchanger to the motor.

In some embodiments, coolant is pumped from the axial bore 310 to the annular gap 308 via a radial hole 306 in the shaft 302. In some embodiments, the windings of the stator 311 are varnished. Varnishing provides mechanical stiffness but may also block fluid flow that may be beneficial for cooling. Holes may be formed in the varnish for promoting fluid flow. In some embodiments, the second pump 313 pumps the coolant through holes in lamination of the stator. In some embodiments, the second pump 313 pumps the coolant through windings of the stator, which are unvarnished.

The coolant may exit the pump 313 and enter the bore 310 of the shaft 302. Then, the coolant may pass through radial holes 306 in the shaft 302. From there, coolant may enter bearing gaps 307 of the journal bearing 304, bearing gap 307b of the journal bearing 304, and/or air gap between the rotor modules 309 and the stator 311. The coolant may also pass through holes in the rotor 309 and/or the stator 311. The coolant may also exit through radial hole 306 in the rotor shaft 302 (e.g., radial holes 306 located between the rotor shaft 302 and the thrust bearing 303). The coolant may then enter the tubing 232 where it travels to the heat exchanger. From the heat exchanger, the coolant may travel down tubing 234 to the sump 314. From the sump 314, the coolant may then re-enter the pump 313. The journal bearings 304 may disposed between the rotor modules 309 and the stator 311. The journal bearings 304 may also be disposed between rotor modules 309 (e.g., segments of the rotor). The motor may have a motor head 301.

Figure 4:
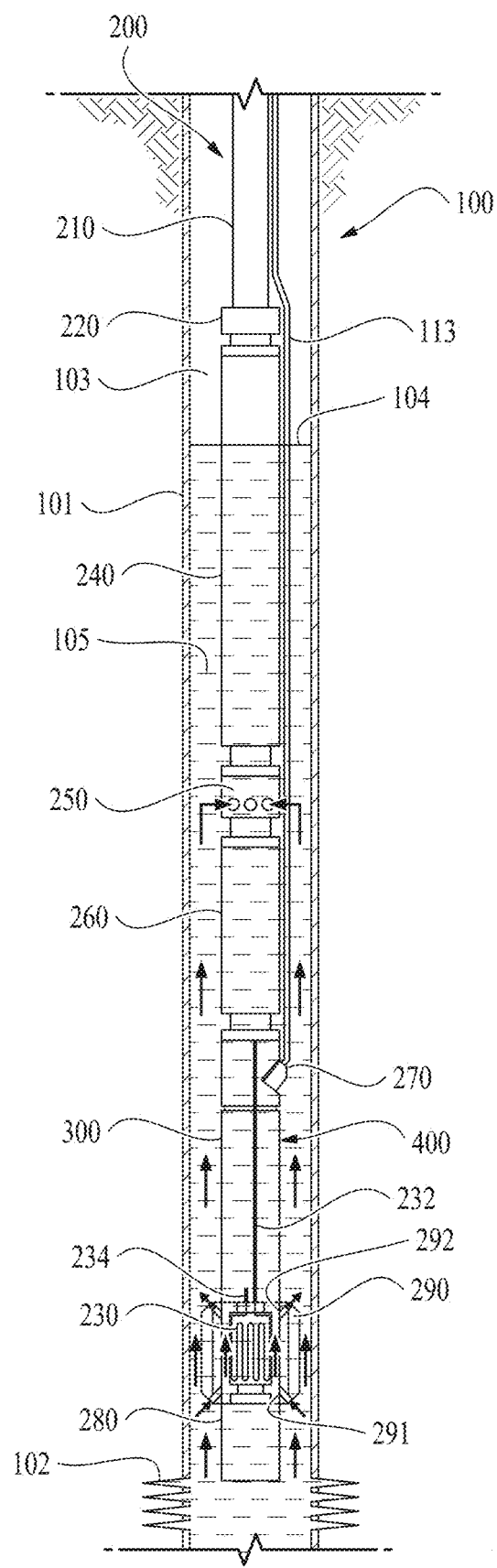
FIG. 4 is a schematic diagram of an exemplary ESP according to another embodiment.

Referring to FIG. 4, the ESP 200 may have the heat exchanger 230 located below the motor 300. The ESP 200 may be positioned well above the perforations 112 in the well 100. Heated oil may exit the motor 300 at its head and be returned to the sump at the motor base. The wellbore fluid 105 may move over the motor 300 at a velocity driven by the production rate, the motor 300 and the casing 101 sizes. The shrouded configuration of the heat exchanger 230 may improve fluid velocity over the heat exchanger 230. The heat exchanger 230 may be located between the downhole gauge 280 and the motor 300. The heat exchanger 230 may be encompassed by a shroud 290. This shroud 290 may have several intake holes 291 displaced in axial or slightly angled orientation with respect to the flow direction, which may allow part of the wellbore fluid to pass through the inside of the shroud 290 and around the heat exchanger 230. The velocity of the flow through the shroud 290 may be relatively increased, which may in turn improve the cooling effect on the heat exchanger 230. The fraction of flow through the shroud 290 may rejoin the main flow of the wellbore fluid 105 and provide cooling for the motor 300 above.

The ESP 200 may include a pump discharge head 220 configured to output the production fluid into the production tubing 210, a pump intake 250 configured to intake the production fluid, a seal section 260 configured to seal the motor 300 from the production fluid, a gauge 280 configured to measure a parameter within a wellbore, a housing 400 enclosing at least the motor 300, a first tubing 232 disposed at least partially outside of the housing 400 and configured to transfer the coolant from the motor 300 to the heat exchanger 230, a second tubing 234 disposed at least partially outside of the housing 400 and configured to transfer the coolant from the heat exchanger 230 to the motor 30, and a shroud 290 encircling the heat exchanger 230. The shroud 290 may be configured to at least partially obstruct an interior of a casing 101 of the wellbore 100 to direct the production fluid (e.g., the wellbore fluid 105) through or across the heat exchanger 230. The first pump 240 may disposed between the pump discharge head 220 and the pump intake 250. The pump intake 250 may be disposed between the first pump 240 and the seal section 260. The seal section 260 may be disposed between the pump intake 250 and the motor 300. The motor 300 may be disposed between the seal section 260 and the heat exchanger 230. The heat exchanger 230 may be disposed between the motor 300 and the gauge 280. As used herein, the term "production fluid" may include any fluid that originates from the well, is inside the well, or has been inside the well. The "production fluid" may refer to such fluid regardless of whether it is inside or outside the ESP 200.

Figure 5:
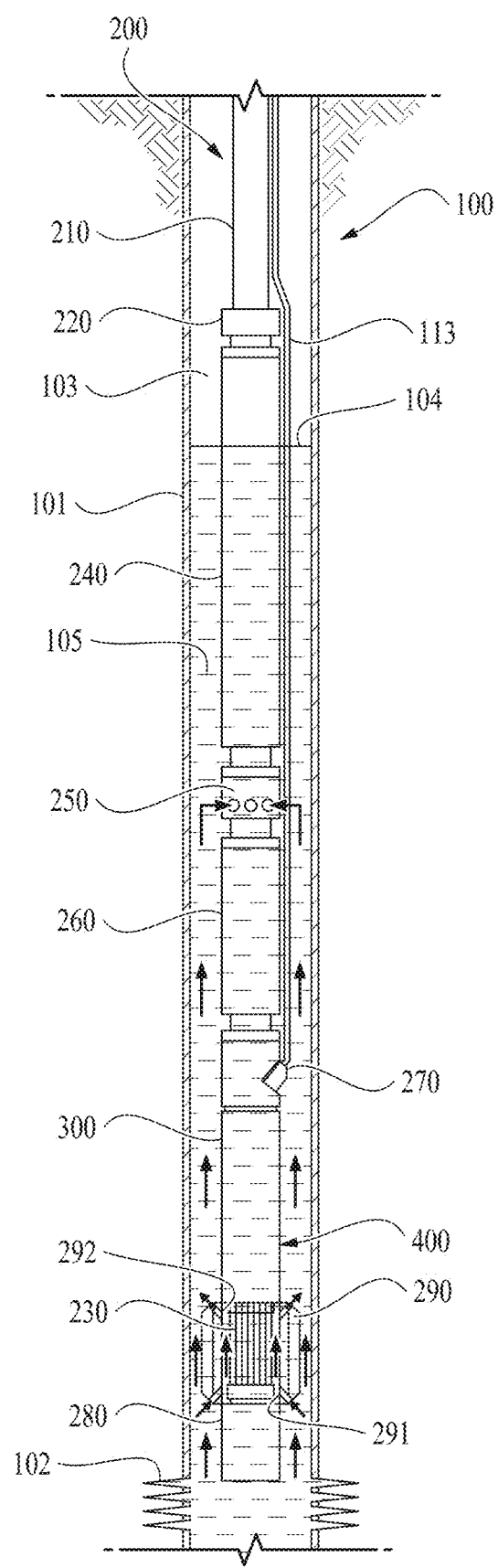
FIG. 5 is a schematic diagram of an exemplary ESP according to yet another embodiment.

Referring to FIG. 5, the heat exchanger 230 may be located below the motor 300 and/or be encompassed by the shroud 290. The ESP 200 may have the external heat exchanger 230, which may be located below the motor 300. The heated oil may exit the motor 300 at its base and may be returned to the sump below the motor base. The motor fluid may be forcibly moved through the motor 300 and may return to the motor base and flow through the cooling tubes of the heat exchanger 230 into the sump located below the heat exchanger 230.

Figure 8:
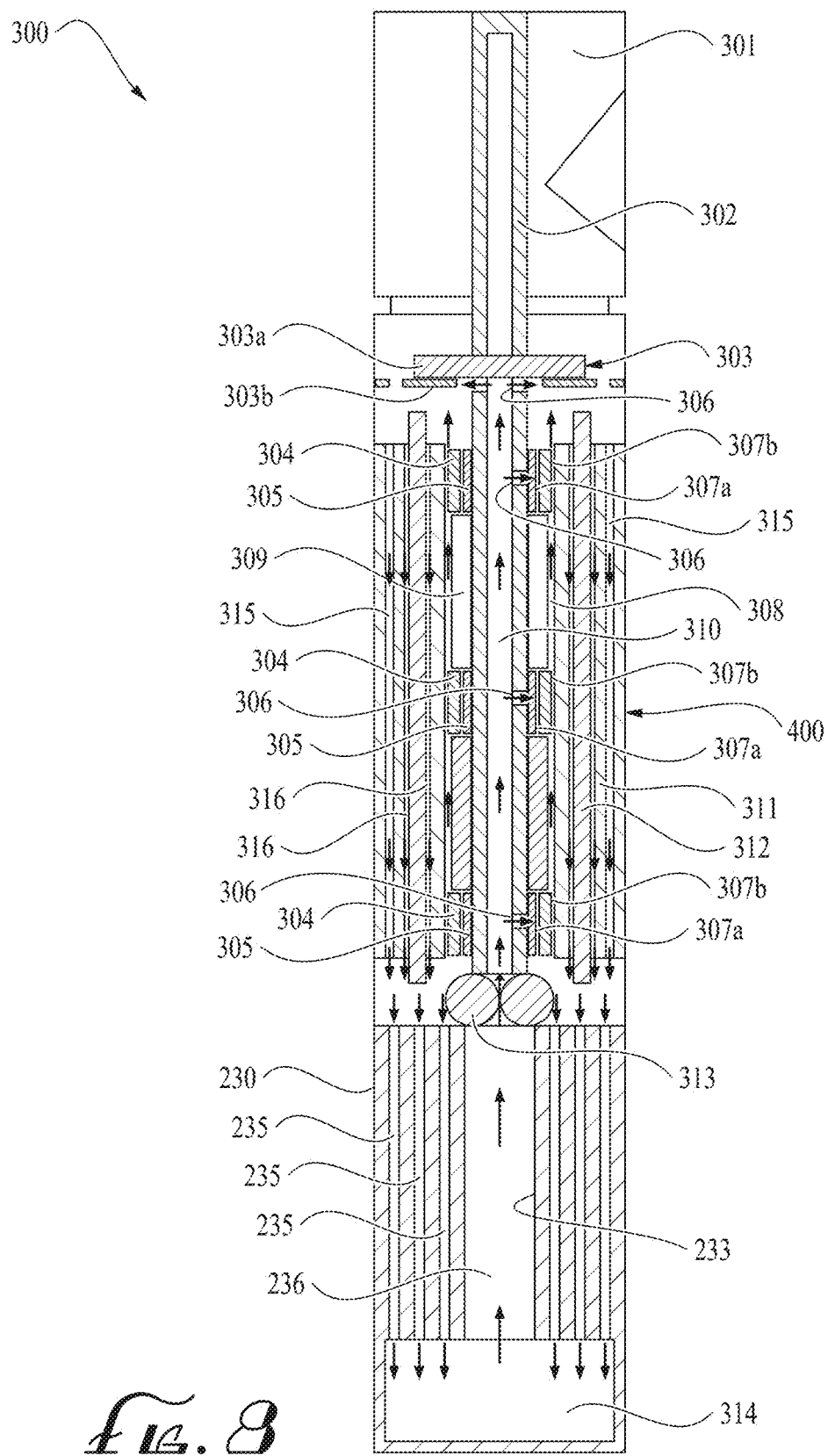
FIG. 8 is a cross-sectional schematic diagram of an exemplary motor according to yet another embodiment.

Referring to FIGS. 5 and 8, the pump discharge head 220 may output the production fluid into the production tubing 210. The pump intake 250 may intake the production fluid. A seal section 260 may seal the motor 300 from the production fluid 105. A gauge 280 may measure a parameter within a wellbore. A housing 400 may enclose at least the motor 300 and/or the heat exchanger 230 and/or other components of the ESP 200. A first flow passageway (e.g., tubing) 235 may be disposed entirely within the housing 400 and transfer the coolant from the motor 300 to the heat exchanger 230. A second flow passageway (e.g., tubing) 236 may be disposed entirely within the housing 400 and transfer the coolant from the heat exchanger 230 to the motor 300.

A shroud 290 may encircle the heat exchanger 230. The shroud 290 may at least partially obstruct an interior of a casing 101 of the wellbore 100 to direct the production fluid through or across the heat exchanger 230. The first pump 240 may be disposed between the pump discharge head 220 and the pump intake 250. The pump intake 250 may be disposed between the first pump 240 and the seal section 260. The seal section 260 may be disposed between the pump intake 250 and the motor 300. The motor 300 may be disposed between the seal section 260 and the heat exchanger 230. The heat exchanger 230 may be disposed between the motor 300 and the gauge 280.

Figure 6:
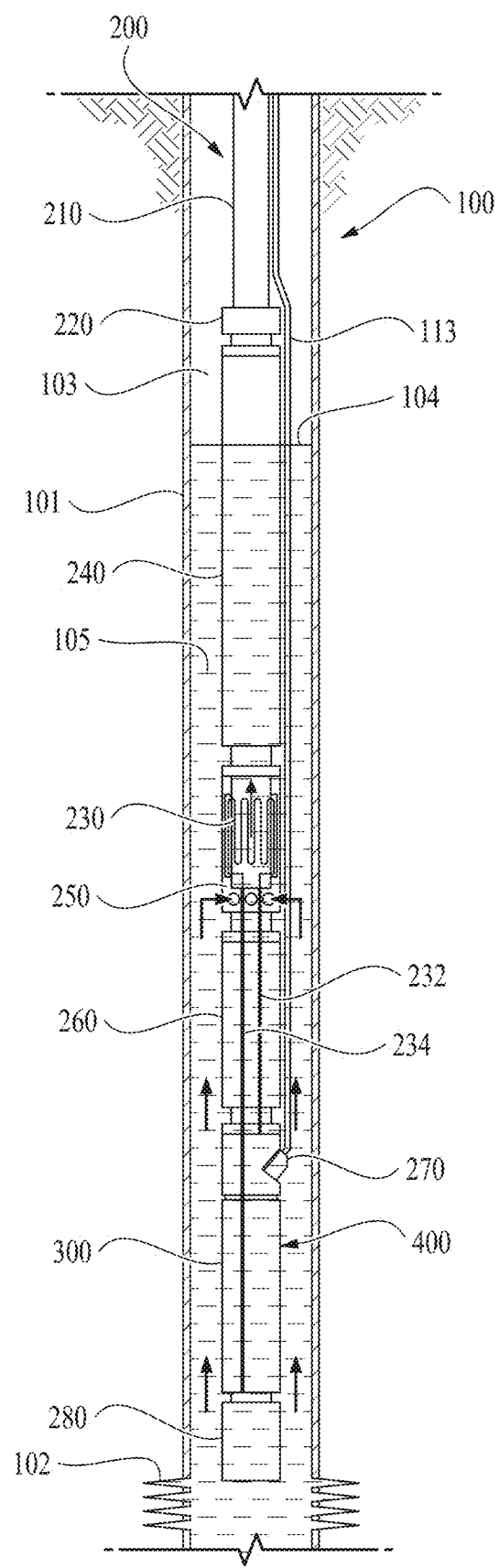
FIG. 6 is a schematic diagram of an exemplary ESP according to yet another embodiment.

Referring to FIG. 6, the external heat exchanger 230 of the ESP 200 may be located between the seal section 260 and the pump 240, at the pump intake 250. The ESP 200 may have an external heat exchanger 230, and the heat exchanger 230 may be located at or near the pump intake 250. This configuration may provide a 100% wellbore fluid passage through the heat exchanger 230, thus providing effective cooling of the heated oil circulating through the cooling tubes of the heat exchanger 230.

The pump discharge head 220 may output the production fluid into the production tubing 210. The pump intake 250 may intake the production fluid. The seal section 260 may seal the motor 300 from the production fluid. The downhole gauge 280 may measure a parameter within the wellbore 103. The housing 400 may enclose the motor 300, other components of the ESP 200, or all components of the ESP 200. A first tubing 232 may be disposed at least partially outside of the housing 400 and transfer the coolant from the motor 300 to the heat exchanger 230. A second tubing 234 may be disposed at least partially outside of the housing 400 and transfer the coolant from the heat exchanger 230 to the motor 300. The first pump 240 may be disposed between the pump discharge head 220 and the heat exchanger 230. The heat exchanger 230 may be disposed between the first pump 240 and the pump intake 250. The pump intake 250 may be disposed between the heat exchanger 230 and the seal section 260. The seal section 260 may be disposed between the pump intake 250 and the motor 300. The motor 300 may be disposed between the seal section 260 and the gauge 280.

Figure 7:
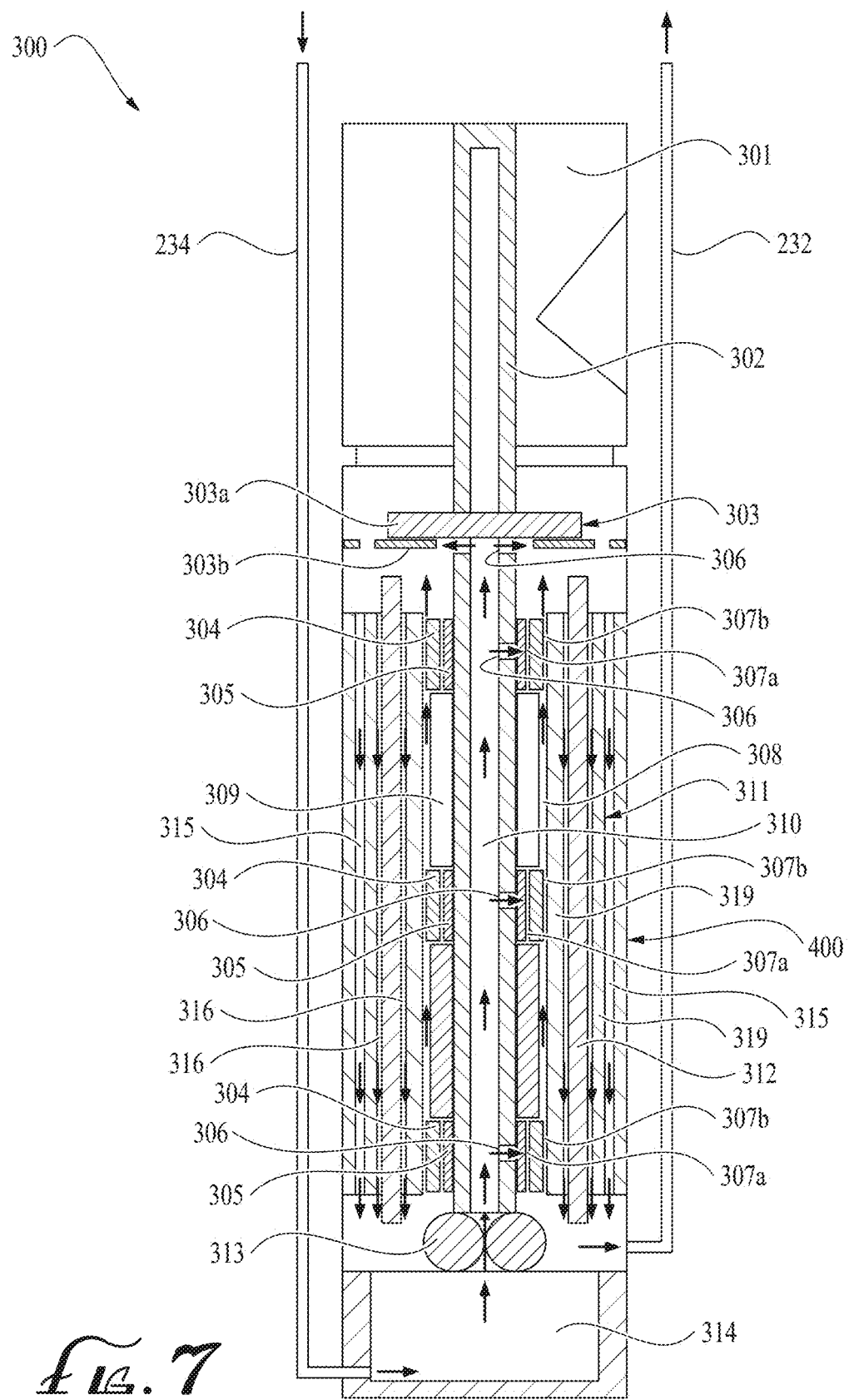
FIG. 7 is a cross-sectional schematic diagram of an exemplary motor according to another embodiment.

Referring to FIG. 7, the motor fluid inside the motor 300 may be forced to return to the motor base through the gaps 316 around the winding 312 and/or through the additional return flow paths 315 in the stator lamination stack 319 of the stator 311. As the motor fluid passes through the gaps 316 in the wound slot and/or return paths 315 in the stator lamination stack 319, it may remove heat from the areas of the stator lamination stack 319 which it contacts. From there, the heated motor fluid may exit the motor through the tubing 232 connected to the heat exchanger 230. The cool motor fluid from the heat exchanger 230 may return to the sump 314 in the motor base through the tubing 234. The gaps 316 around the winding can be present if the stator is not varnished or encapsulated. The return flow paths 315 in the stator lamination stack can be produced by holes in the individual lams which can be stacked up to form the return flow paths. These holes can be present in varnished or encapsulated stators.

The housing 400 may enclose at least the motor 300. A first tubing 232 may extend from the motor 300 downhole of the stator 311. The first tubing 232 may be disposed at least partially outside of the housing 400. The first tubing may transfer the coolant from the motor 300 to the heat exchanger 230. A second tubing 234 may extend from the motor 300 downhole of the stator 311. The second tubing 234 may be disposed at least partially outside of the housing 400. The second tubing 234 may transfer the coolant from the heat exchanger 230 back to the motor 300.

Coolant may flow from the pump 313, through the bore 310, and through the radial holes 306. The coolant may further flow through the bearing gap 307a, the bearing gap 307b, the air gap 308, gaps and/or holes 306 formed between the windings 312 and the lamination stack 319. The coolant may then flow through the tubing 232 which may be coupled to the motor 300 (e.g., extend from the motor 300) at a location between the stator 311 and the sump 314 and/or radially outward with respect to the pump 313. After traveling through the heat exchanger, the coolant flows through the tubing 234 and into the sump 314 (e.g., the tubing 234 may be coupled to and/or extend from the sump 314). The pump 313 may be disposed between the stator 311 and the sump 314.

Referring to FIG. 8, oil from the motor base is may be circulated through the heat exchanger 230, which may be connected to the motor base. The heat exchanger 230 may include a series of tubes 235 for heat exchanging elements. As shown in FIG. 8, the tubes 235 may be parallel. In other embodiments, the heat exchanger 230 may include a continuous flow path for the cooling fluid. The cooling fluid may flow out of the tubes 235. The motor 300 may be a rotary positive displacement pump.

The motor fluid may be forcibly moved from the motor base through the shaft bore 310, bearing radial holes 306, the air gap 308 to the motor head and back to the motor base through the winding slot gaps and/or additional holes in the stator lamination stack. Similarly, the motor fluid inside the motor 300 may be forced to return to the motor base through the gaps 316 around the winding 312 and/or through the additional return flow paths 315 in the stator lamination stack 319 of the stator 311. As the motor fluid passes through the gaps 316 of the wound slots and/or holes 315 in the stator lamination stack 319, it may remove heat from the areas of the stator lamination stack 319 which it contacts. The heated oil returned to the motor base may be pushed through the cooling tubes 235 of the heat exchanger 230 connected to the motor base into the sump 314 below the heat exchanger 230. The cool oil may be returned into the motor 300 through the center bore (e.g., flow passageway) 236 of the heat exchangers 230 by the rotary positive displacement pump 313. The inside wall 233 of the heat exchanger center bore 236 may be insulated so that minimal heat transfer occurs between the cooler motor fluid in the center bore 236 and the hotter motor fluid in the cooling tubes 235. The embodiment shown in FIG. 8 may present the advantage of not needing external tubing, but may require the pump intake 250 to be above the perforations 102 to allow production fluid flow over the heat exchanger 230. A shroud 290 may be used to increase the flow velocity in the heat exchanger 230 area.

The housing 400 may enclose at least the motor 300 and the heat exchanger 230. The housing 400 may enclose other components of the ESP 200 or the entire ESP 200. The first flow passageway 232 may extend from the motor 300 downhole from the stator 311. The first flow passageway 232 may be disposed entirely within the housing 400. The first flow passageway 232 may transfer the coolant from the motor to the heat exchanger 230. The second flow passageway 234 may extend from the motor 300 downhole from the stator 311. The second flow passageway 234 may be disposed entirely within the housing 400. The second flow passageway 234 may transfer the coolant from the heat exchanger 230 to the motor 300. In some embodiments, the heat exchanger 230 is integrally formed with the pump discharge. For example, the heat exchanger 230 and the electric motor 300 may share a common housing 400. In another example, at least part of motor 300 and at least part of the heat exchanger 230 are cast as one piece.

The fluid may flow from the pump 313, through the bore 310, through the radial holes 306, through the bearing cap 307, through the bearing gap 307a, through the bearing gap 307b, and/or through the air gap 308. The fluid may further flow out of the radial holes 306 proximate to the thrust bearing 303 and through the return flow path 315. The fluid may enter the flow passageway (e.g., tubing) 232. The tubing 232 may be on an opposite side of the pump 313 as the rotor shaft 302. There may be multiple flow passageways in any suitable configuration leading to the sump 314. From the sump 314, fluid may flow through the second flow passageway 234 (e.g., a bore, tubing, or any other suitable passageway). The second flow passageway 234 may be disposed radially inward with respect to the first flow passageway 232.

Figure 9:
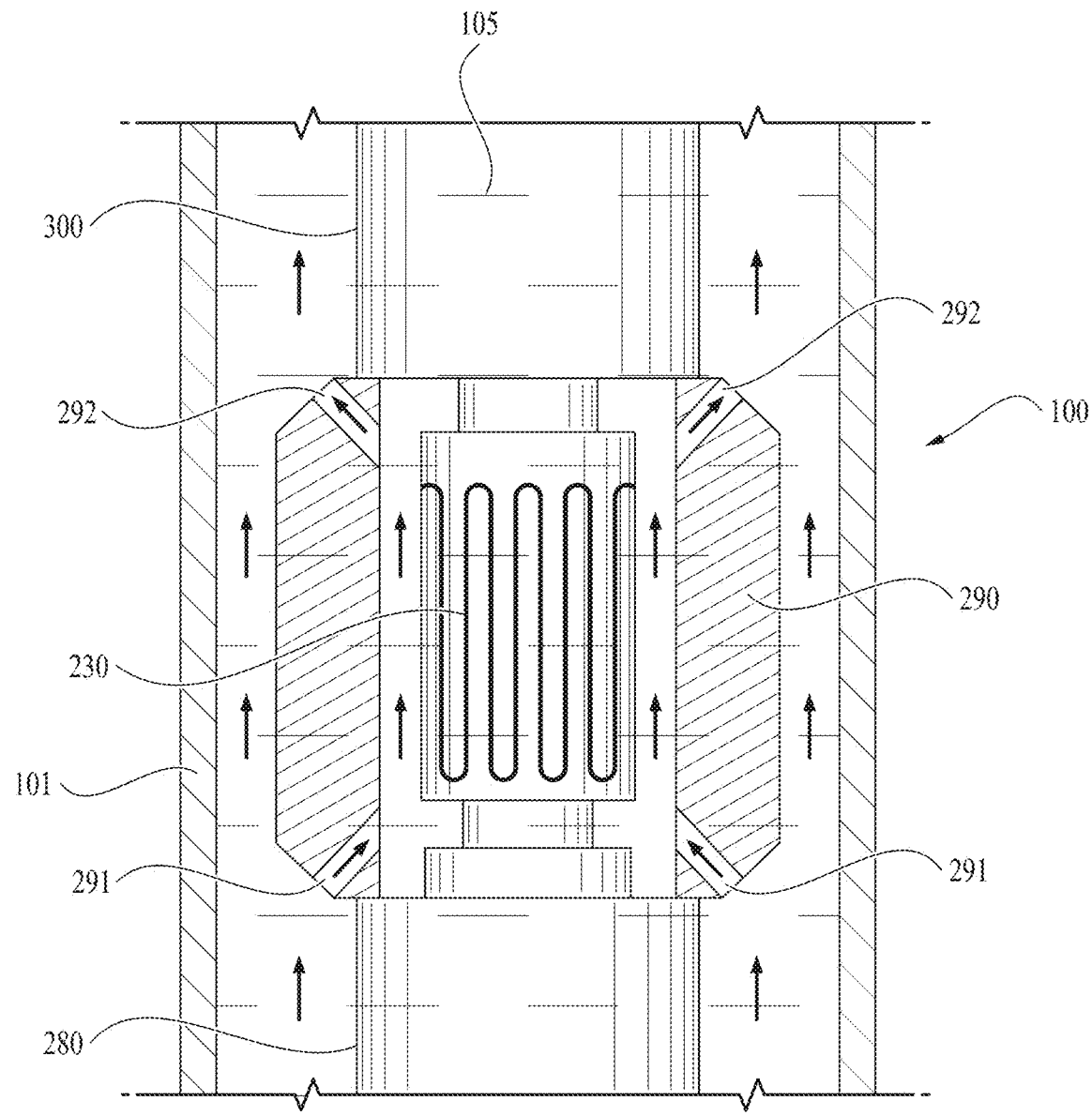
FIG. 9 is a schematic diagram of an exemplary shroud according to an embodiment.

Referring to FIG. 9, the shroud 290 is shown in detail. The shroud 290 may encircle the heat exchanger 230. The shroud 290 may at least partially obstruct an interior of a casing 101 to direct the production fluid through or across the heat exchanger 230. This may force fluid to flow through the heat exchanger (e.g., the velocity of the fluid flow through the heat exchanger may be increased). The shroud 290 may be fixed to the heat exchanger. The shroud 290 may be cylindrical. The shroud 290 may be localized to the heat exchanger 230, and thus flow to the heat exchanger 230 through the cooling element may be increased. Some of the flow may go around the shroud 290 and may not enter the heat exchanger. Some of the flow may enter intake holes 291 in the shroud 290, pass through or across the heat exchanger, and exit through outlet holes 292 in the shroud 290. The intake holes 291 may be disposed at one axial end of the shroud 290, and the outlet holes 292 may be disposed at the other axial end of the shroud 290. In some embodiments, the shroud 290 is a ring.

Figure 10:
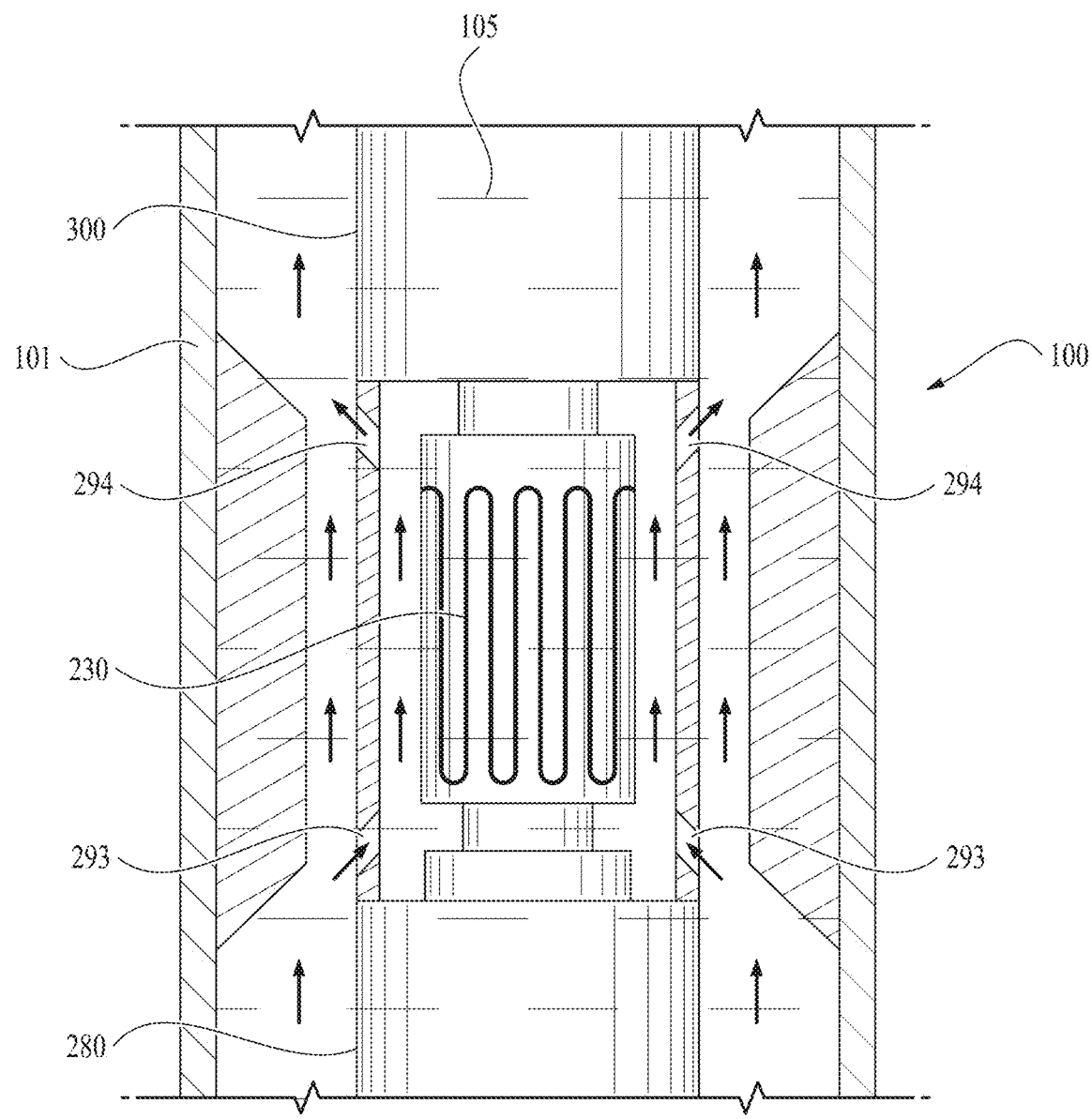
FIG. 10 is a schematic diagram of an exemplary shroud according to another embodiment.

Referring to FIG. 10, another embodiment of the shroud 290 is shown. The shroud 290 may encircle the heat exchanger 230. The shroud 290 may be configured to at least partially obstruct an interior of a casing 101 to direct the production fluid through or across the heat exchanger 230. The shroud may be fixed to the casing 101. This may increase the velocity of flow through a volume between the shroud 290 and the heat exchanger and also through and/or across the heat exchanger elements. For example, flow may enter an intake holes 293 in the heat exchanger 230, pass through the heat exchanger 230, and exit through an outlet holes 294. Although some of the flow passes by the heat exchanger 230 without going through the inlet 293, because of the obstruction of the shroud 290, flow velocity may be increased and more effective cooling may be achieved.

Figure 11:
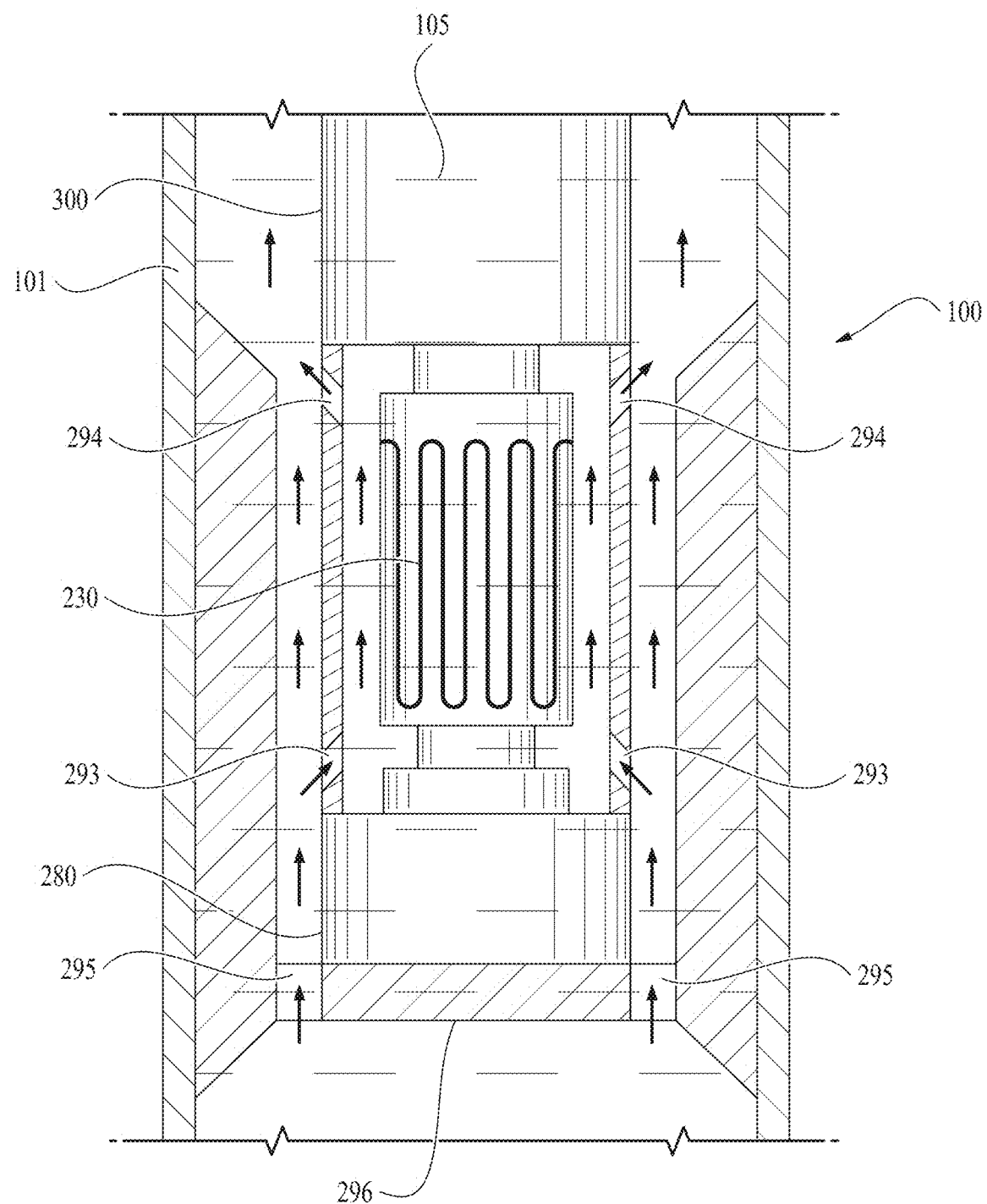
FIG. 11 is a schematic diagram of an exemplary shroud according to yet another embodiment.

Referring to FIG. 11, another embodiment of the shroud 290 is shown. The shroud 290 may encircle the heat exchanger 230. The shroud 290 may at least partially obstruct an interior of a casing 101 to direct the production fluid through or across the heat exchanger 230. The shroud 290 may include a landing 296 configured to support the heat exchanger 230. The ESP may be lowered until the end of the ESP makes contact with the landing 296. Flow may enter a volume between the shroud 290 and the heat exchanger 230 through a fluid passageway 295 of the shroud 290. Some of the fluid may pass by the heat exchanger 230, and some of the fluid may enter an inlet 293 of the heat exchanger 230, pass through heat transfer elements inside the heat exchanger 230, and exit the heat exchanger 230 through the outlet 294.

Figure 12:
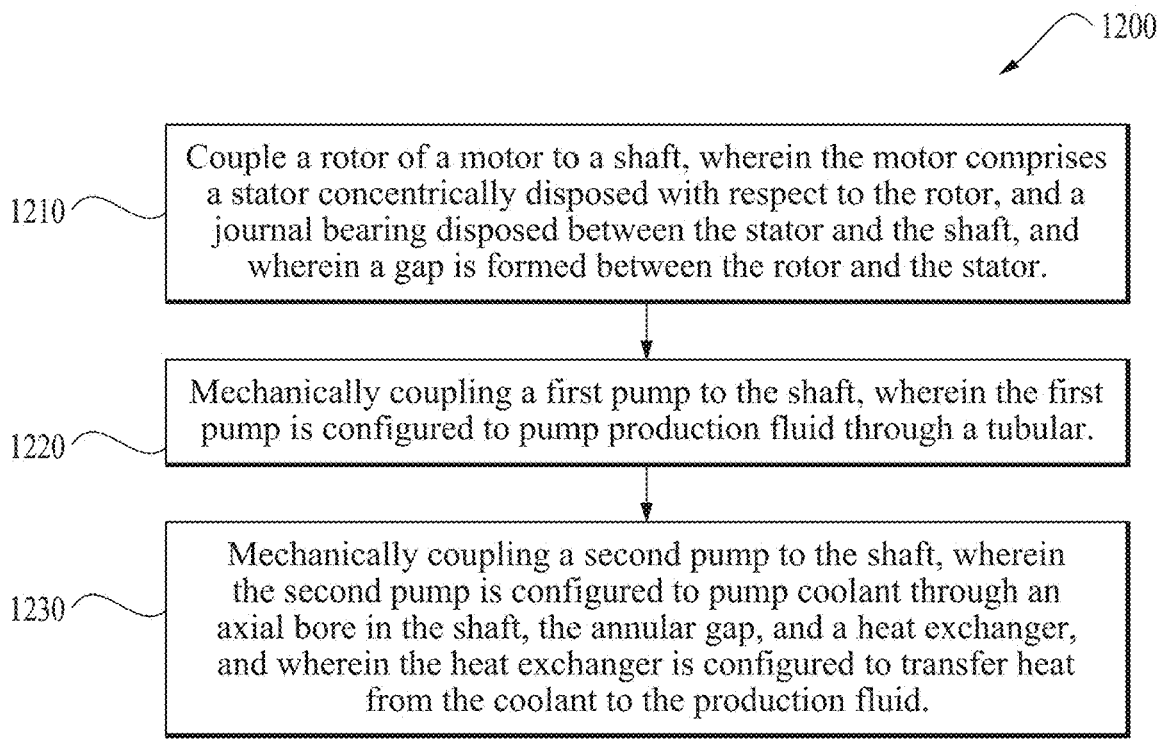
FIG. 12 is a flow diagram of an exemplary method of assembling an ESP, according to an embodiment.

Referring to FIG. 12, an exemplary method 1200 of assembling an ESP 200 may include the step 1210 of rotationally coupling a rotor of a motor to the shaft, wherein the motor comprises a stator concentrically disposed with respect to the rotor, and a journal bearing disposed between the stator and the shaft, and wherein an annular gap is formed between the rotor and the stator; the step 1220 of mechanically coupling a first pump to the shaft, wherein the first pump is configured to pump production fluid through a tubular; and the step 1230 of mechanically coupling a second pump to the shaft, wherein the second pump is configured to pump coolant through an axial bore in the shaft, the annular gap, and a heat exchanger, and wherein the heat exchanger is configured to transfer heat from the coolant to the production fluid.

In some embodiments, the method 1200 further includes connecting a first tubing to the motor and to the heat exchanger, wherein the first tubing is disposed at least partially outside of a housing enclosing at least the motor; and connecting a second tubing to the motor and to the heat exchanger, wherein the second tubing is disposed at least partially outside of the housing. In some embodiments, the method 1200 further includes connecting the first tubing to the motor uphole with respect to the stator, and connecting the second tubing to the motor downhole with respect to the stator. In some embodiments, the method 1200 further includes connecting the first tubing to the motor downhole with respect to the stator, and connecting the second tubing to the motor downhole with respect to the stator. In some embodiments, the method 1200 further includes connecting a first fluid passageway to the motor and to the heat exchanger, wherein the first fluid passageway is disposed entirely inside of a housing enclosing at least the motor and the heat exchanger; and connecting a second fluid passageway to the motor and to the heat exchanger, wherein the second fluid passageway is disposed entirely inside of the housing. In some embodiments, the method 1200 further includes connecting the first tubing to the motor downhole with respect to the stator, and connecting the second tubing to the motor downhole with respect to the stator.

Figure 13:
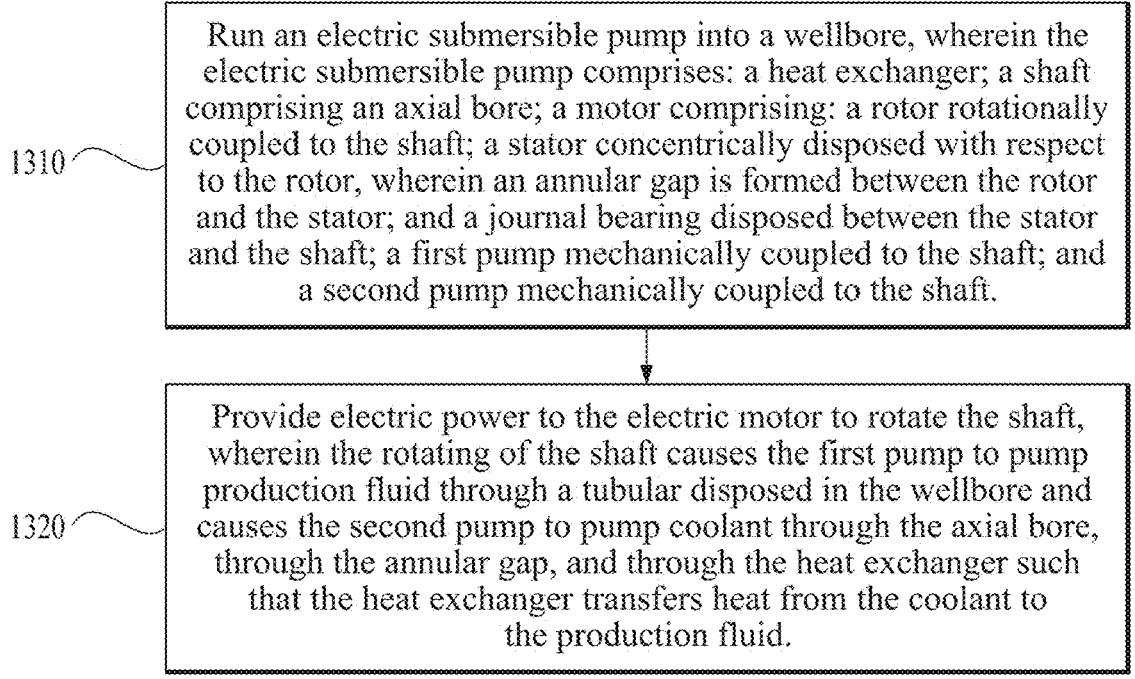
FIG. 13 is a flow diagram of an exemplary method of lifting fluid in a wellbore, according to an embodiment.

Referring to FIG. 13, an exemplary method 1300 of lifting fluid in a wellbore comprises the step 1310 of running an electric submersible pump into the wellbore, wherein the electric submersible pump comprises: a heat exchanger; a shaft comprising an axial bore; a motor comprising: a rotor rotationally coupled to the shaft; a stator concentrically disposed with respect to the rotor, wherein an annular gap is formed between the rotor and the stator; and a journal bearing disposed between the stator and the shaft; a first pump mechanically coupled to the shaft; and a second pump mechanically coupled to the shaft; and providing electric power to the electric motor to rotate the shaft, wherein the rotating of the shaft causes the first pump to pump production fluid through a tubular disposed in the wellbore and causes the second pump to pump coolant through the axial bore, through the annular gap, and through the heat exchanger such that the heat exchanger transfers heat from the coolant to the production fluid.

In some embodiments, the method 1300 further includes positioning a pump intake of the electric submersible pump downhole with respect to perforations in a casing of the wellbore. In some embodiments, the method 1300 further includes positioning the heat exchanger uphole with respect to perforations in a casing of the wellbore. In some embodiments, the method 1300 further includes using a shroud encircling the heat exchanger to obstruct an interior of a casing of the wellbore to direct the production fluid through or across the heat exchanger, wherein the running of the electric submersible pump into the wellbore comprises positioning the shroud uphole with respect to perforations in the casing. In some embodiments, the method 1300 further includes landing the electric submersible pump on a shroud, wherein the shroud obstructs an interior of a casing of the wellbore to direct the production fluid through or across the heat exchanger.

The various embodiments disclosed herein may be combined in any suitable manner. For example, any of the embodiments of the ESP 200 shown in of FIGS. 2, 4, 5, and 6 may be matched with any of the embodiments of the motor 300 and/or heat exchanger 230 shown in FIGS. 3, 7, and 8. In addition, any of the parts disclosed herein may be duplicated. For example, there may be multiple heat exchangers, e.g., there may be one heat exchanger at or near the top of the ESP 200 and one heat exchanger at or near the bottom of the ESP 200.

The systems and methods disclosed herein may present the advantage of improving the cooling of a motor in an ESP. Because of the enhanced rate of heat transfer away from the motor, the motor may be run faster, in hotter environments, in smaller diameter casings and/or in other environments that may present thermal challenges.

Additional Disclosure

The following are non-limiting, specific embodiments in accordance with the present disclosure:

In a first embodiment, an electric submersible pump comprises a heat exchanger; a shaft comprising an axial bore; a motor comprising a rotor rotationally coupled to the shaft, a stator concentrically disposed with respect to the rotor, wherein an annular gap is formed between the rotor and the stator, and a journal bearing disposed between the stator and the shaft; a first pump mechanically coupled to the shaft and configured to pump production fluid through a tubular; and a second pump mechanically coupled to the shaft and configured to pump coolant through the axial bore, the annular gap, and the heat exchanger, wherein the heat exchanger is configured to transfer heat from the coolant to the production fluid to cool the motor.

A second embodiment can include the electric submersible pump of the first embodiment, further comprising a pump discharge head configured to output the production fluid into the production tubing, a pump intake configured to intake the production fluid, a seal section configured to seal the motor from the production fluid, a downhole gauge configured to measure a parameter within a wellbore, a housing enclosing at least the motor, a first tubing disposed at least partially outside of the housing and configured to transfer the coolant from the motor to the heat exchanger, and a second tubing disposed at least partially outside of the housing and configured to transfer the coolant from the heat exchanger to the motor, wherein the heat exchange is disposed between the pump discharge head and the first pump, wherein the first pump is disposed between the heat exchanger and the pump intake, wherein the pump intake is disposed between the first pump and the seal section, wherein the seal section is disposed between the pump intake and the motor, and wherein the motor is disposed between the seal section and the gauge.

A third embodiment can include the electric submersible pump of the first or second embodiments, further comprising a pump discharge head configured to output the production fluid into the production tubing, a pump intake configured to intake the production fluid, a seal section configured to seal the motor from the production fluid, a downhole gauge configured to measure a parameter within a wellbore, a housing enclosing at least the motor, a first tubing disposed at least partially outside of the housing and configured to transfer the coolant from the motor to the heat exchanger, a second tubing disposed at least partially outside of the housing and configured to transfer the coolant from the heat exchanger to the motor, and a shroud encircling the heat exchanger, wherein the shroud is configured to at least partially obstruct an interior of a casing of the wellbore to direct the production fluid through or across the heat exchanger, wherein the first pump is disposed between the pump discharge head and the pump intake, wherein the pump intake is disposed between the first pump and the seal section, wherein the seal section is disposed between the pump intake and the motor, wherein the motor is disposed between the seal section and the heat exchanger, and wherein the heat exchanger is disposed between the motor and the gauge.

A fourth embodiment can include the electric submersible pump of any of the first through third embodiments, further comprising a pump discharge head configured to output the production fluid into the production tubing, a pump intake configured to intake the production fluid, a seal section configured to seal the motor from the production fluid, a downhole gauge configured to measure a parameter within a wellbore, a housing enclosing at least the motor and the heat exchanger, a first tubing disposed entirely within the housing and configured to transfer the coolant from the motor to the heat exchanger, a second tubing disposed entirely within the housing and configured to transfer the coolant from the heat exchanger to the motor, and a shroud encircling the heat exchanger, wherein the shroud is configured to at least partially obstruct an interior of a casing of the wellbore to direct the production fluid through or across the heat exchanger, wherein the first pump is disposed between the pump discharge head and the pump intake, wherein the pump intake is disposed between the first pump and the seal section, wherein the seal section is disposed between the pump intake and the motor, wherein the motor is disposed between the seal section and the heat exchanger, and wherein the heat exchanger is disposed between the motor and the gauge.

A fifth embodiment can include the electric submersible pump of any of the first through fourth embodiments, further comprising a pump discharge head configured to output the production fluid into the production tubing, a pump intake configured to intake the production fluid, a seal section configured to seal the motor from the production fluid, a downhole gauge configured to measure a parameter within a wellbore, a housing enclosing at least the motor, a first tubing disposed at least partially outside of the housing and configured to transfer the coolant from the motor to the heat exchanger, and a second tubing disposed at least partially outside of the housing and configured to transfer the coolant from the heat exchanger to the motor, wherein the first pump is disposed between the pump discharge head and the heat exchanger, wherein the heat exchanger is disposed between the first pump and the pump intake, wherein the pump intake is disposed between the heat exchanger and the seal section, wherein the seal section is disposed between the pump intake and the motor, and wherein the motor is disposed between the seal section and the downhole gauge.

A sixth embodiment can include the electric submersible pump of any of the first through fifth embodiments, further comprising a housing enclosing at least the motor; a first tubing extending from a point of the motor uphole with respect to the stator, disposed at least partially outside of the housing, and configured to transfer the coolant from the motor to the heat exchanger; and a second tubing extending from a point of the motor downhole with respect to the stator, disposed at least partially outside of the housing, and configured to transfer the coolant from the heat exchanger to the motor.

A seventh embodiment can include the electric submersible pump of any of the first through sixth embodiments, further comprising a housing enclosing at least the motor; a first tubing extending from a point of the motor downhole with respect to the stator, disposed at least partially outside of the housing, and configured to transfer the coolant from the motor to the heat exchanger; and a second tubing extending from a point of the motor downhole with respect to the stator, disposed at least partially outside of the housing, and configured to transfer the coolant from the heat exchanger to the motor.

An eighth embodiment can include the electric submersible pump of any of the first through seventh embodiments, further comprising a housing enclosing at least the motor and the heat exchanger; a first tubing extending from the motor downhole from the stator, disposed entirely within the housing, and configured to transfer the coolant from the motor to the heat exchanger; and a second tubing extending from the motor downhole from the stator, disposed entirely within the housing, and configured to transfer the coolant from the heat exchanger to the motor.

A ninth embodiment can include the electric submersible pump of any of the first through eighth embodiments, further comprising a shroud encircling the heat exchanger, wherein the shroud is configured to at least partially obstruct an interior of a casing to direct the production fluid through or across the heat exchanger, and wherein the shroud is fixed to the heat exchanger.

A tenth embodiment can include the electric submersible pump of any of the first through ninth embodiments, further comprising a shroud configured to encircle the heat exchanger, wherein the shroud is configured to at least partially obstruct an interior of a casing to direct the production fluid through or across the heat exchanger, and wherein the shroud is fixed to the casing.

An eleventh embodiment can include the electric submersible pump of any of the first through tenth embodiments, further comprising a shroud configured to encircle the heat exchanger, wherein the shroud is configured to at least partially obstruct an interior of a casing to direct the production fluid through or across the heat exchanger, and wherein the shroud comprises a landing configured to support the heat exchanger.

In a twelfth embodiment, a method of assembling an electric submersible pump, comprising: rotationally coupling a rotor of a motor to the shaft, wherein the motor comprises a stator concentrically disposed with respect to the rotor, and a journal bearing disposed between the stator and the shaft, and wherein an annular gap is formed between the rotor and the stator; mechanically coupling a first pump to the shaft, wherein the first pump is configured to pump production fluid through a tubular; and mechanically coupling a second pump to the shaft, wherein the second pump is configured to pump coolant through an axial bore in the shaft, the annular gap, and a heat exchanger, and wherein the heat exchanger is configured to transfer heat from the coolant to the production fluid.

A thirteenth embodiment can include the method of the twelfth embodiment, further comprising connecting a first tubing to the motor and to the heat exchanger, wherein the first tubing is disposed at least partially outside of a housing enclosing at least the motor; and connecting a second tubing to the motor and to the heat exchanger, wherein the second tubing is disposed at least partially outside of the housing.

A fourteenth embodiment can include the method of the twelfth or thirteenth embodiments, wherein the connecting of the first tubing comprises connecting the first tubing to the motor uphole with respect to the stator, and the connecting of the second tubing comprises connecting the second tubing to the motor downhole with respect to the stator.

A fifteenth embodiment can include the method of any of the twelfth through fourteenth embodiments, wherein the connecting of the first tubing comprises connecting the first tubing to the motor downhole with respect to the stator, and the connecting of the second tubing comprises connecting the second tubing to the motor downhole with respect to the stator.

A sixteenth embodiments can include the method of any of the twelfth through fifteenth embodiments, further comprising connecting a first tubing to the motor and to the heat exchanger, wherein the first tubing is disposed entirely inside of a housing enclosing at least the motor and the heat exchanger; and connecting a second tubing to the motor and to the heat exchanger, wherein the second tubing is disposed entirely inside of the housing.

A seventeenth embodiment can include the method of any of the twelfth through sixteenth embodiments, wherein the connecting of the first tubing comprises connecting the first tubing to the motor downhole with respect to the stator, and the connecting of the second tubing comprises connecting the second tubing to the motor downhole with respect to the stator.

In an eighteenth embodiment, a method of lifting fluid in a wellbore comprises running an electric submersible pump into the wellbore, wherein the electric submersible pump comprises a heat exchanger, a shaft comprising an axial bore, a motor comprising a rotor rotationally coupled to the shaft, a stator concentrically disposed with respect to the rotor, wherein an annular gap is formed between the rotor and the stator, and a journal bearing disposed between the stator and the shaft, a first pump mechanically coupled to the shaft, and a second pump mechanically coupled to the shaft; and providing electric power to the electric motor to rotate the shaft, wherein the rotating of the shaft causes the first pump to pump production fluid through a tubular disposed in the wellbore and causes the second pump to pump coolant through the axial bore, through the annular gap, and through the heat exchanger such that the heat exchanger transfers heat from the coolant to the production fluid.

A nineteenth embodiment can include the method of the eighteenth embodiment, wherein the running of the electric submersible pump comprises positioning a pump intake of the electric submersible pump downhole with respect to perforations in a casing of the wellbore.

A twentieth embodiment can include the method of the eighteenth or nineteenth embodiments, wherein the running of the electric submersible pump comprises positioning the heat exchanger uphole with respect to perforations in a casing of the wellbore.

A twenty-first embodiment can include the method of any of the eighteenth through twentieth embodiments, further comprising using a shroud encircling the heat exchanger to obstruct an interior of a casing of the wellbore to direct the production fluid through or across the heat exchanger, wherein the running of the electric submersible pump into the wellbore comprises positioning the shroud uphole with respect to perforations in the casing.

A twenty-second embodiment can include the method of any of the eighteenth through twenty-first embodiments, further comprising landing the electric submersible pump on a shroud, wherein the shroud obstructs an interior of a casing of the wellbore to direct the production fluid through or across the heat exchanger.

A twenty-third embodiment can include the method of any of the eighteenth through twenty-second embodiments, wherein the coolant is pumped from the axial bore to the annular gap via a radial hole in the shaft.

A twenty-fourth embodiment can include the method of any of the eighteenth through twenty-third embodiments, wherein the second pump further pumps the coolant through holes in lamination of the stator.

A twenty-fifth embodiment can include the method of any of the eighteenth through twenty-fourth embodiments, wherein the second pump further pumps the coolant through windings of the stator, which are unvarnished or unencapsulated.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Disclosure of a singular element should be understood to provide support for a plurality of the element. It is contemplated that elements of the present disclosure may be duplicated in any suitable quantity.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" does not require selection of only one element. Thus, the phrase "A or B" is satisfied by either one or both elements from the set {A, B}, including multiples of either element; and the phrase "A, B, or C" is satisfied by any element from the set {A, B, C} or any combination thereof, including multiples of any element. A clause that recites "A, B, or C" can be infringed with only one of the listed items, multiple of the listed items, and one or more of the items in the list and another item not listed.

As used herein, the article "a" means "one or more." As used herein, the article "an" means "one or more." As used herein, the article "the" when referring to a singular noun means "the one or more." Thus, the phrase "an element" means "one or more elements;" and the phrase "the element" means "the one or more elements."

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. An electric submersible pump, comprising:
   a heat exchanger;
   a shaft comprising an axial bore;
   a motor comprising:
      a rotor rotationally coupled to the shaft;
      a stator concentrically disposed with respect to the rotor, wherein a gap is formed between the rotor and the stator; and
      a journal bearing disposed between the stator and the shaft;
   a first pump mechanically coupled to the shaft and configured to pump production fluid through a production tubing;
   a second pump mechanically coupled to the shaft and configured to pump coolant through the axial bore, the gap, and the heat exchanger, wherein the heat exchanger is configured to transfer heat from the coolant to the production fluid;
   a pump discharge head configured to output the production fluid into the production tubing;
   a pump intake configured to intake the production fluid;
   a seal section configured to seal the motor from the production fluid;
   a downhole gauge configured to measure a parameter within a wellbore;
   a housing enclosing at least the motor;
   a first tubing disposed at least partially outside of the housing and configured to transfer the coolant from the motor to the heat exchanger; and
   a second tubing disposed at least partially outside of the housing and configured to transfer the coolant from the heat exchanger to the motor,
   wherein the heat exchanger is disposed between the pump discharge head and the first pump,
   wherein the first pump is disposed between the heat exchanger and the pump intake,
   wherein the pump intake is disposed between the first pump and the seal section,
   wherein the seal section is disposed between the pump intake and the motor, and
   wherein the motor is disposed between the seal section and the gauge.

2. The electric submersible pump of claim 1, further comprising a shroud encircling the heat exchanger, wherein the shroud is configured to at least partially obstruct an interior of a casing to direct the production fluid through or across the heat exchanger, and wherein the shroud is fixed to the heat exchanger.

3. The electric submersible pump of claim 1, further comprising a shroud configured to encircle the heat exchanger and at least partially obstruct an interior of a casing to direct the production fluid through or across the heat exchanger, wherein the shroud is fixed to the casing.

4. The electric submersible pump of claim 1, further comprising a shroud configured to encircle the heat exchanger and at least partially obstruct an interior of a casing to direct the production fluid through or across the heat exchanger, wherein the shroud comprises a landing configured to support the heat exchanger.

5. A method of lifting fluid in a wellbore, comprising:
running an electric submersible pump into a wellbore, the electric submersible pump comprising:
  a heat exchanger;
  a shaft comprising an axial bore;
  a motor comprising:
    a rotor rotationally coupled to the shaft;
    a stator concentrically disposed with respect to the rotor, wherein a gap is formed between the rotor and the stator; and
    a journal bearing disposed between the stator and the shaft;
  a first pump mechanically coupled to the shaft;
  a second pump mechanically coupled to the shaft;
  a pump discharge head configured to output the production fluid into a production tubing;
  a pump intake configured to intake the production fluid;
  a seal section configured to seal the motor from the production fluid;
  a downhole gauge configured to measure a parameter within a wellbore;
  a housing enclosing at least the motor;
  a first tubing disposed at least partially outside of the housing and configured to transfer the coolant from the motor to the heat exchanger; and
  a second tubing disposed at least partially outside of the housing and configured to transfer the coolant from the heat exchanger to the motor, wherein the heat exchanger is disposed between the pump discharge head and the first pump, wherein the first pump is disposed between the heat exchanger and the pump intake, wherein the pump intake is disposed between the first pump and the seal section, wherein the seal section is disposed between the pump intake and the motor, and wherein the motor is disposed between the seal section and the gauge; and
providing electric power to the motor to rotate the shaft, wherein the rotating of the shaft causes the first pump to pump the production fluid through the production tubing and causes the second pump to pump coolant through the axial bore, the gap, and the heat exchanger such that the heat exchanger transfers heat from the coolant to the production fluid.

6. The method of claim 5, wherein the running of the electric submersible pump into the wellbore comprises positioning the pump intake downhole with respect to perforations in a casing of the wellbore.

7. The method of claim 5, wherein the running of the electric submersible pump into the wellbore comprises positioning the heat exchanger uphole with respect to perforations in a casing of the wellbore.

8. The method of claim 5, wherein the running of the electric submersible pump into the wellbore comprises positioning a shroud uphole with respect to perforations in a casing of the wellbore such that the shroud encircles the heat exchanger, and wherein the shroud obstructs an interior of the casing to direct the production fluid through or across the heat exchanger.

9. The method of claim 5, further comprising landing the electric submersible pump on a shroud, wherein the shroud obstructs an interior of a casing of the wellbore to direct the production fluid through or across the heat exchanger.

10. The method of claim 5, wherein the coolant is pumped from the axial bore to the gap via radial holes in the shaft.

11. The method of claim 5, wherein the second pump pumps the coolant through holes in lamination of the stator.

12. The method of claim 5, wherein the second pump pumps the coolant through windings of the stator, which are unlaminated.

13. An electric submersible pump, comprising:
  a heat exchanger;
  a shaft comprising an axial bore;
  a motor comprising:
    a rotor rotationally coupled to the shaft;
    a stator concentrically disposed with respect to the rotor, wherein a gap is formed between the rotor and the stator; and
    a journal bearing disposed between the stator and the shaft;
  a first pump mechanically coupled to the shaft and configured to pump production fluid through a production tubing;
  a second pump mechanically coupled to the shaft and configured to pump coolant through the axial bore, the gap, and the heat exchanger, wherein the heat exchanger is configured to transfer heat from the coolant to the production fluid;
  a pump discharge head configured to output the production fluid into the production tubing;
  a pump intake configured to intake the production fluid;
  a seal section configured to seal the motor from the production fluid;
  a gauge configured to measure a parameter within a wellbore;
  a housing enclosing at least the motor;
  a first tubing disposed at least partially outside of the housing and configured to transfer the coolant from the motor to the heat exchanger;
  a second tubing disposed at least partially outside of the housing and configured to transfer the coolant from the heat exchanger to the motor; and
  a shroud encircling the heat exchanger,
wherein the shroud is configured to at least partially obstruct an interior of a casing of the wellbore to direct the production fluid through or across the heat exchanger,
wherein the first pump is disposed between the pump discharge head and the pump intake,
wherein the pump intake is disposed between the first pump and the seal section,
wherein the seal section is disposed between the pump intake and the motor,
wherein the motor is disposed between the seal section and the heat exchanger, and
wherein the heat exchanger is disposed between the motor and the gauge.

14. The electric submersible pump of claim 13, wherein the shroud is fixed to the heat exchanger.

15. The electric submersible pump of claim 13, wherein the shroud is fixed to the casing.

16. The electric submersible pump of claim 13, wherein the shroud comprises a landing configured to support the heat exchanger.

17. An electric submersible pump, comprising:
  a heat exchanger;
  a shaft comprising an axial bore;
  a motor comprising:
    a rotor rotationally coupled to the shaft;
    a stator concentrically disposed with respect to the rotor, wherein a gap is formed between the rotor and the stator; and
    a journal bearing disposed between the stator and the shaft;

a first pump mechanically coupled to the shaft and configured to pump production fluid through a production tubing;
a second pump mechanically coupled to the shaft and configured to pump coolant through the axial bore, the gap, and the heat exchanger, wherein the heat exchanger is configured to transfer heat from the coolant to the production fluid;
a pump discharge head configured to output the production fluid into the production tubing;
a pump intake configured to intake the production fluid;
a seal section configured to seal the motor from the production fluid;
a gauge configured to measure a parameter within a wellbore;
a housing enclosing at least the motor and the heat exchanger;
a first flow passageway disposed entirely within the housing and configured to transfer the coolant from the motor to the heat exchanger;
a second flow passageway disposed entirely within the housing and configured to transfer the coolant from the heat exchanger to the motor; and
a shroud encircling the heat exchanger,
wherein the shroud is configured to at least partially obstruct an interior of a casing of the wellbore to direct the production fluid through or across the heat exchanger,
wherein the first pump is disposed between the pump discharge head and the pump intake,
wherein the pump intake is disposed between the first pump and the seal section,
wherein the seal section is disposed between the pump intake and the motor,
wherein the motor is disposed between the seal section and the heat exchanger, and
wherein the heat exchanger is disposed between the motor and the gauge.

18. The electric submersible pump of claim 17, wherein the shroud is fixed to the heat exchanger.

19. The electric submersible pump of claim 17, wherein the shroud is fixed to the casing.

20. The electric submersible pump of claim 17, wherein the shroud comprises a landing configured to support the heat exchanger.

21. An electric submersible pump, comprising:
a heat exchanger;
a shaft comprising an axial bore;
a motor comprising:
  a rotor rotationally coupled to the shaft;
  a stator concentrically disposed with respect to the rotor, wherein a gap is formed between the rotor and the stator; and
  a journal bearing disposed between the stator and the shaft;
a first pump mechanically coupled to the shaft and configured to pump production fluid through a production tubing;
a second pump mechanically coupled to the shaft and configured to pump coolant through the axial bore, the gap, and the heat exchanger, wherein the heat exchanger is configured to transfer heat from the coolant to the production fluid;
a pump discharge head configured to output the production fluid into the production tubing;
a pump intake configured to intake the production fluid;
a seal section configured to seal the motor from the production fluid;
a gauge configured to measure a parameter within a wellbore;
a housing enclosing at least the motor;
a first tubing disposed at least partially outside of the housing and configured to transfer the coolant from the motor to the heat exchanger; and
a second tubing disposed at least partially outside of the housing and configured to transfer the coolant from the heat exchanger to the motor,
wherein the first pump is disposed between the pump discharge head and the heat exchanger,
wherein the heat exchanger is disposed between the first pump and the pump intake,
wherein the pump intake is disposed between the heat exchanger and the seal section,
wherein the seal section is disposed between the pump intake and the motor, and
wherein the motor is disposed between the seal section and the gauge.

22. The electric submersible pump of claim 21, further comprising a shroud encircling the heat exchanger, wherein the shroud is configured to at least partially obstruct an interior of a casing to direct the production fluid through or across the heat exchanger, and wherein the shroud is fixed to the heat exchanger.

23. The electric submersible pump of claim 21, further comprising a shroud configured to encircle the heat exchanger and at least partially obstruct an interior of a casing to direct the production fluid through or across the heat exchanger, wherein the shroud is fixed to the casing.

24. The electric submersible pump of claim 21, further comprising a shroud configured to encircle the heat exchanger and at least partially obstruct an interior of a casing to direct the production fluid through or across the heat exchanger, wherein the shroud comprises a landing configured to support the heat exchanger.

* * * * *